(12) United States Patent
Niu et al.

(10) Patent No.: US 6,608,690 B2
(45) Date of Patent: Aug. 19, 2003

(54) OPTICAL PROFILOMETRY OF ADDITIONAL-MATERIAL DEVIATIONS IN A PERIODIC GRATING

(75) Inventors: Xinhui Niu, Los Altos, CA (US); Nickhil Jakatdar, Los Altos, CA (US)

(73) Assignee: Timbre Technologies, Inc., Santa Clara, CA (US)

(*) Notice: Subject to any disclaimer, the term of this patent is extended or adjusted under 35 U.S.C. 154(b) by 0 days.

(21) Appl. No.: 10/007,124

(22) Filed: Dec. 4, 2001

(65) Prior Publication Data

US 2003/0103218 A1 Jun. 5, 2003

(51) Int. Cl.$^7$ .............................................. G01B 11/24

(52) U.S. Cl. ..................... 356/635; 356/601; 356/445; 702/76

(58) Field of Search ................................ 356/601, 610, 356/612, 614, 625, 635, 636, 445, 446, 369, 630, 631, 632; 250/559.22, 559.19, 225; 359/573, 566, 575; 369/101; 702/76, 84

(56) References Cited

U.S. PATENT DOCUMENTS

| | | | |
|---|---|---|---|
| 5,164,790 A | 11/1992 | McNeil et al. | |
| 5,607,800 A | 3/1997 | Ziger | |
| 5,739,909 A | 4/1998 | Blayo et al. | |
| 5,835,225 A | 11/1998 | Thakur | |
| 5,867,276 A | 2/1999 | McNeil et al. | |
| 5,963,329 A | 10/1999 | Conrad et al. | |
| 6,172,811 B1 * | 1/2001 | Wood et al. | 359/573 |
| 6,243,348 B1 * | 6/2001 | Goodberlet | 369/101 |
| 2002/0033954 A1 * | 3/2002 | Niu et al. | 356/601 |

OTHER PUBLICATIONS

N. W. Ashcroft et al., "Solid State Physics", Saunders College, Philadelphia, 1976, pp. 133–134.

Azzam et al., "Ellipsometry and Polarized Light", North Holland library, Amsterdam, 1987, book.

Ch. M. Bishop, "Neural Networks for Pattern Recognition", Clarendon Press–Oxford, 1995, Ch. 4,, pp. 116–163.

G. Granet et al., "Efficient implementation of the coupled-wave method for metallic lamellar in TM polarization", J. Opt. Soc. Am. vol. 13, No. 5, May 1996, pp. 1019–1023.

(List continued on next page.)

Primary Examiner—Hoa Q. Pham
(74) Attorney, Agent, or Firm—Morrison & Foerster LLP

(57) ABSTRACT

Disclosed is a method and system for measurement of periodic gratings which have deviations which result in more than two materials occurring along at least one line in the periodic direction. A periodic grating is divided into a plurality of hypothetical layers, each hypothetical layer having a normal vector orthogonal to the direction of periodicity, each hypothetical layer having a single material within any line parallel to the normal vector, and at least one of the hypothetical layers having at least three materials along a line in the direction of periodicity. A harmonic expansion of the permittivity $\epsilon$ or inverse permittivity $1/\epsilon$ is performed along the direction of periodicity for each of the layers including the layer which includes the first, second and third materials. Fourier space electromagnetic equations are then set up in each of the layers using the harmonic expansion of the permittivity $\epsilon$ or inverse permittivity $1/\epsilon$, and Fourier components of electric and magnetic fields in each layer. The Fourier space electromagnetic equations are then coupled based on boundary conditions between the layers, and solved to provide the calculated diffraction spectrum.

60 Claims, 13 Drawing Sheets

OTHER PUBLICATIONS

P. Lalanne et al., "Highly improved convergence of the coupled-wave method for TM polarization", J. Opt. Soc. Am. vol. 13, No. 4, Apr. 1996, pp. 779–784.

L. Li et al., "Convergence of the coupled-wave method for metallic lamellar diffraction gratings", J. Opt. Soc. Am. vol. 10, No. 6, Jun. 1993, pp. 1184–1189.

M. G. Moharam et al., "Rigorous coupled-wave analysis of planar-grating diffraction", J. Opt. Soc. Am. vol. 71, No. 7/Jul. 1981, pp. 811–818.

M. G. Moharam et al., "Formulation for stable and efficient implementation of the rigorous coupled-wave analysis of binary gratings", J. Opt. Soc. Am. vol. 12, No. 5, May 1995, pp. 1068–1076.

Moharam et al., "Stable implementation of the rigorous coupled-wave analysis for surface-relief gratings: enhanced transmittance matrix approach", J. Opt. Soc. Am. vol. 12, No. 5, May 1995, pp. 1077–1086.

X. Niu, "Specular Spectroscopic Scatterometry in DUV Lithography", IEEE Trans. on Semiconductor Manuf. vol. 14, No. 2, May 2001, 10 pgs.

J. A. Rice, "Mathematical Statistics and Data Analysis" sec. ed., ch. 14, Duxbury Press, 1995, pp. 507–570.

W. H. Press et al., "Numerical Recipes", Cambridge University Press, 1986, pp. 444–455.

* cited by examiner

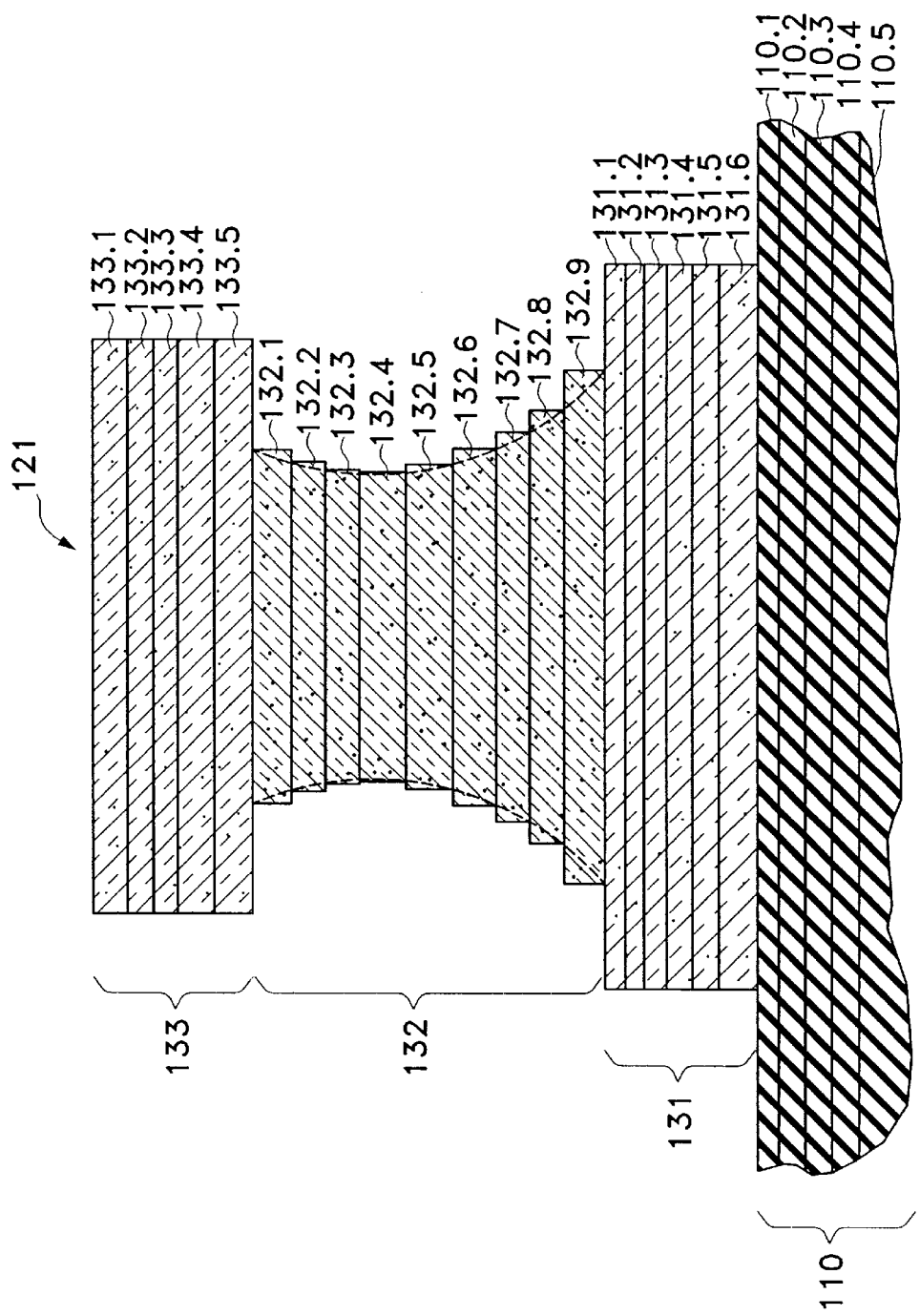

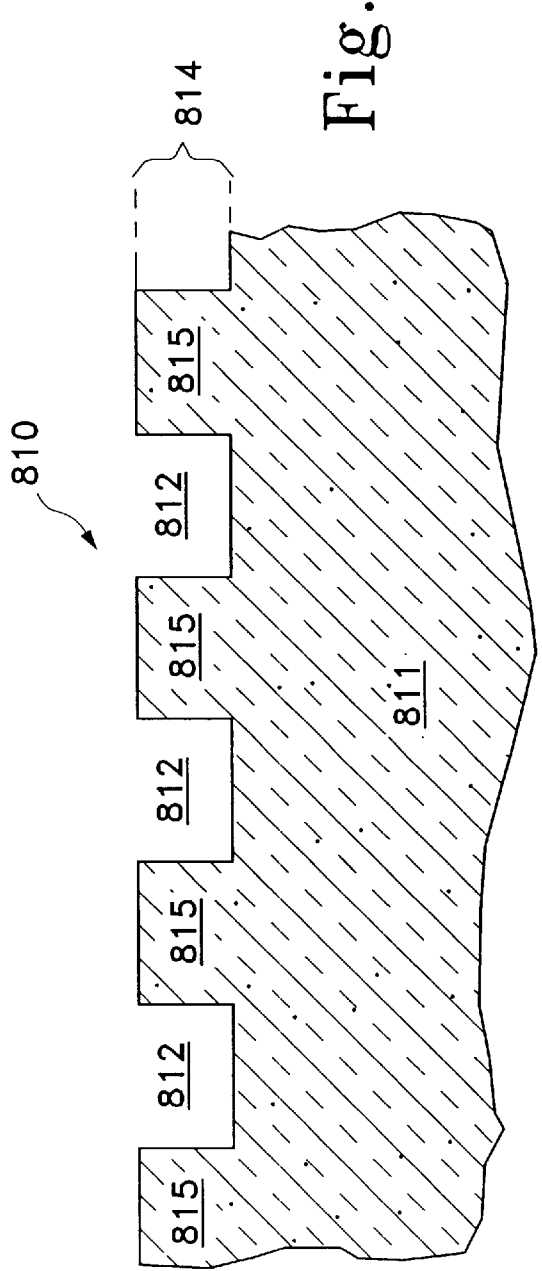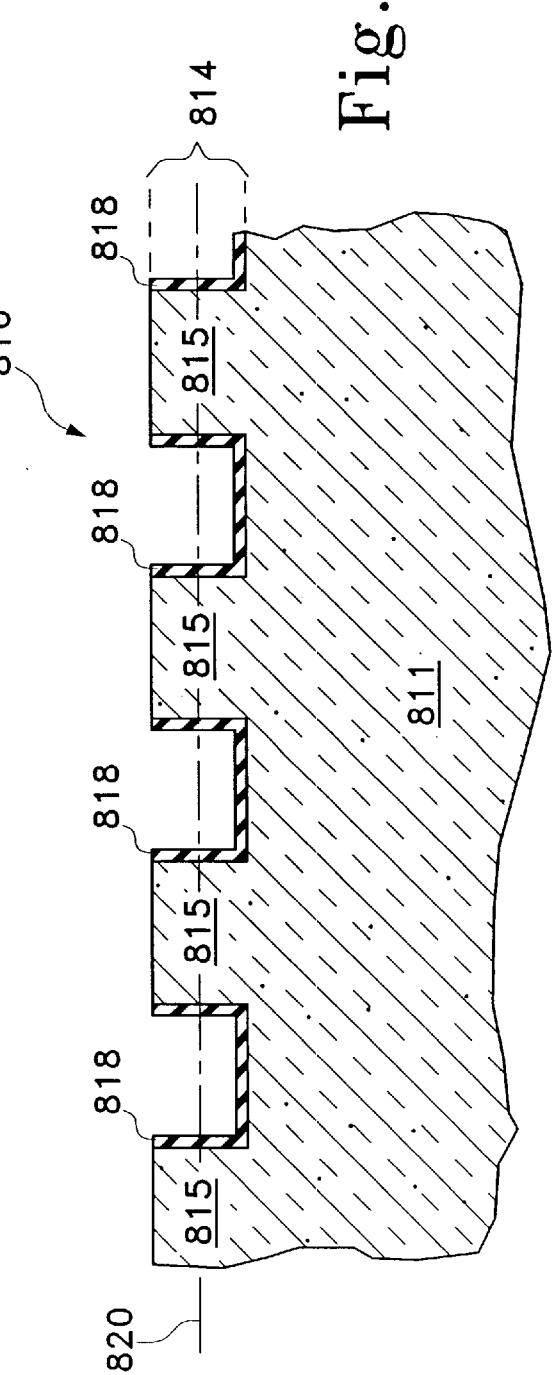

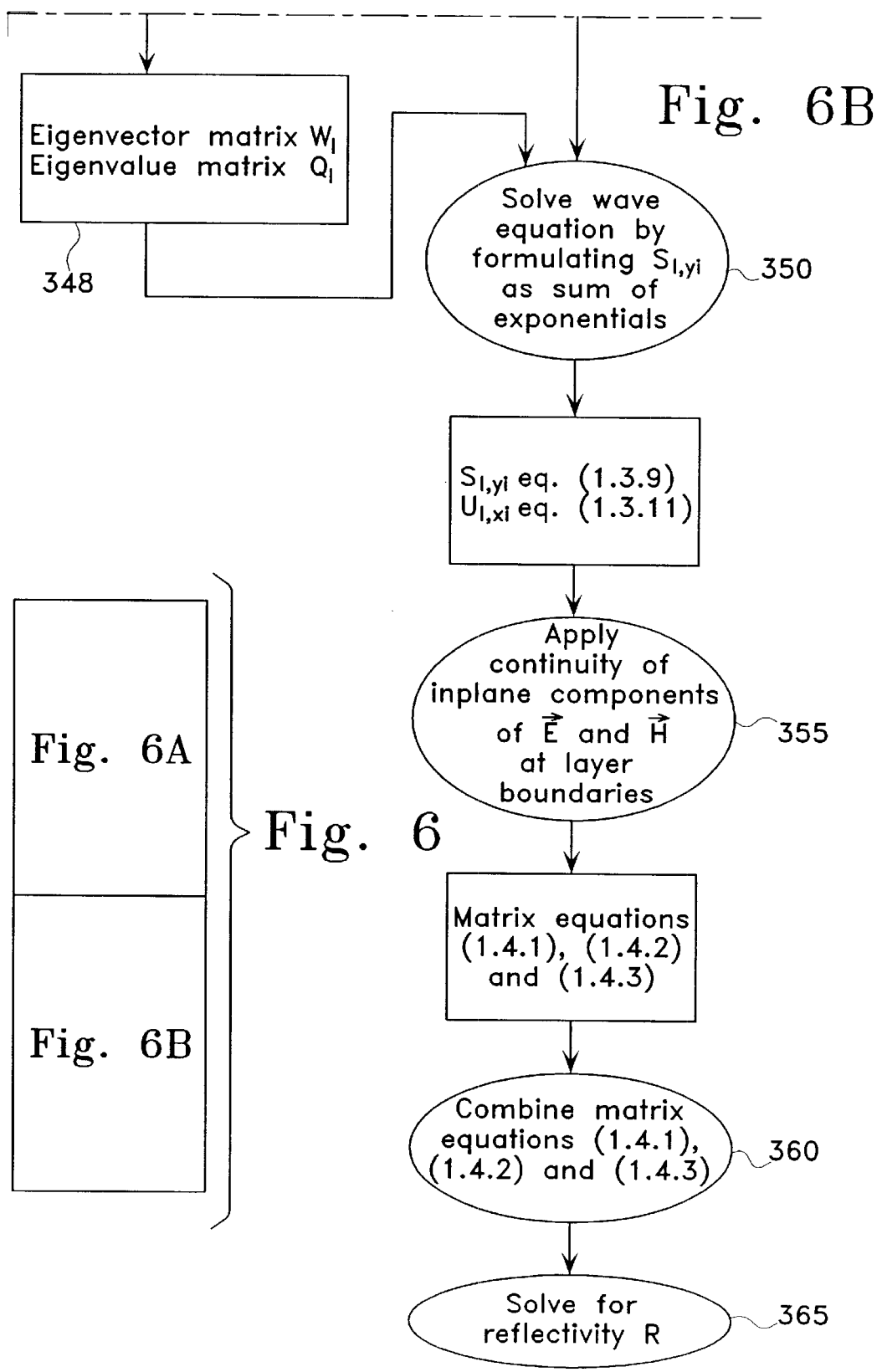

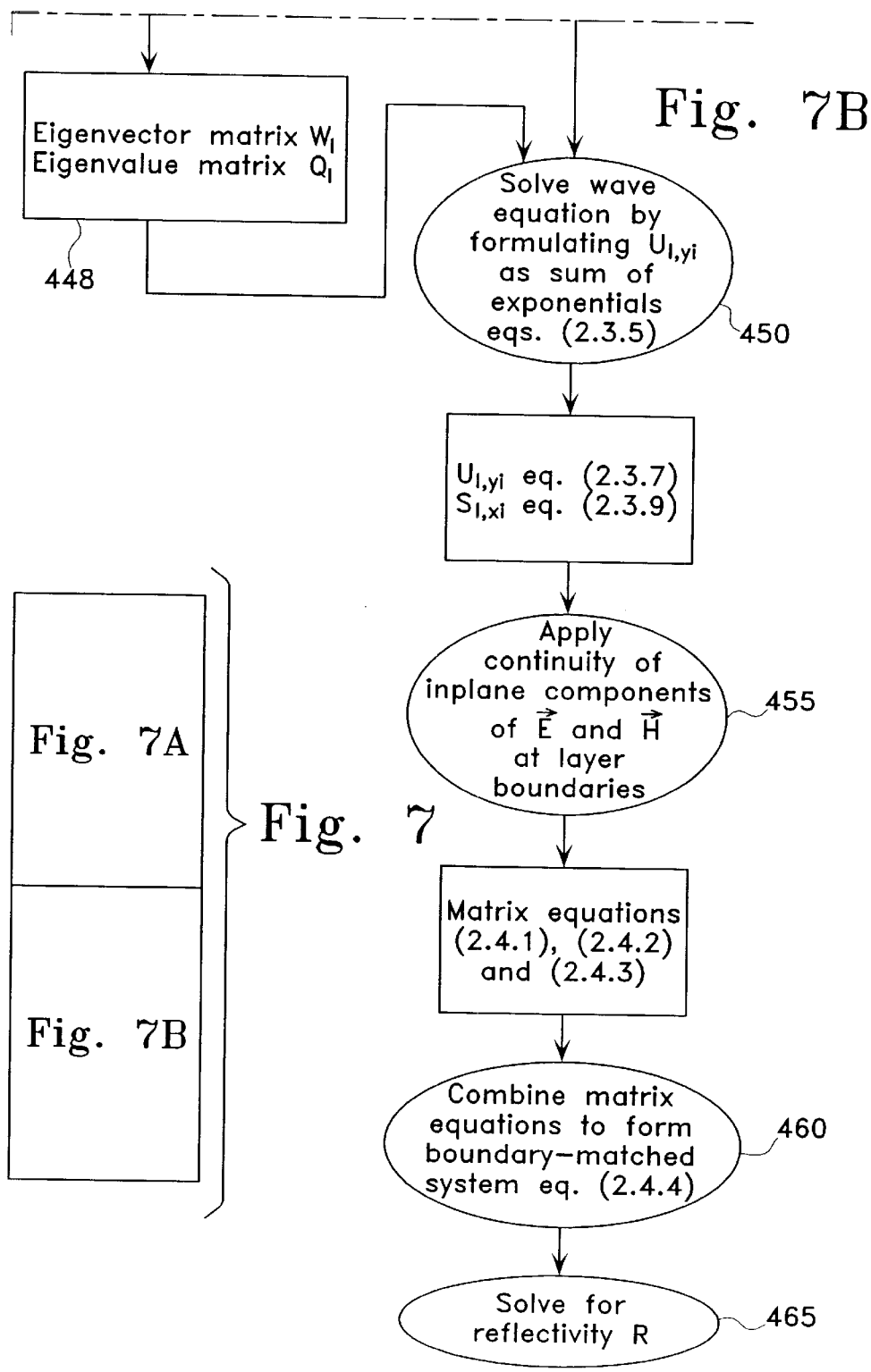

OPTICAL PROFILOMETRY OF ADDITIONAL-MATERIAL DEVIATIONS IN A PERIODIC GRATING

RELATED DOCUMENTS

The present application is based on Disclosure Document serial number 474051, filed May 15, 2000, entitled Optical Profilometry for Periodic Gratings with Three or More Materials per Layer by the same inventors. Therefore, it is requested that the above-specified Disclosure Document be retained in the file of the present patent application.

TECHNICAL FIELD

The present invention relates generally to the measurement of periodic surface profiles using optical techniques such as spectroscopic ellipsometry. In particular, the present invention relates to optical profilometry of profile deviations of semiconductor fabrication processes, more particularly, additional-material deviations in a periodic grating.

BACKGROUND OF THE INVENTION

There is continual pressure on the semiconductor microchip industry to reduce the dimensions of semiconductor devices. Reduction in the size of semiconductor chips has been achieved by continually reducing the dimensions of transistors and other devices implemented on microchip arrays. As the scale of semiconductor devices decreases, control of the complete profile of the features is crucial for effective chip operation. However, limitations in current fabrication technologies make formation of precise structures difficult. For example, completely vertical sidewalls and completely horizontal top and bottom surfaces in device formation are difficult, if not impossible, to achieve. Sloping sidewalls and top and bottom surfaces are common. Additionally, other artifacts such as "T-topping" (the formation of a "T" shaped profile) and "footing" (the formation of an inverse "T" shaped profile) are common in microchip manufacturing. Metrology of such details about the profile is important in achieving a better understanding of the fabrication technologies. In addition to measuring such features, controlling them is also important in this highly competitive marketplace. There are thus increasing efforts to develop and refine run-to-run and real-time fabrication control schemes that include profile measurements to reduce process variability.

Optical metrology methods require a periodic structure for analysis. Some semiconductor devices, such as memory arrays, are periodic. However, generally a periodic test structure will be fabricated at a convenient location on the chip for optical metrology. Optical metrology of test periodic structures has the potential to provide accurate, high-throughput, non-destructive means of profile metrology using suitably modified existing optical metrology tools and off-line processing tools. Two such optical analysis methods include reflectance metrology and spectroscopic ellipsometry.

In reflectance metrology, an unpolarized or polarized beam of broadband light is directed towards a sample, and the reflected light is collected. The reflectance can either be measured as an absolute value, or relative value when normalized to some reflectance standard. The reflectance signal is then analyzed to determine the thicknesses and/or optical constants of the film or films. There are numerous examples of reflectance metrology. For example, U.S. Pat. No. 5,835,225 given to Thakur et.al. teaches the use of reflectance metrology to monitor the thickness and refractive indices of a film.

The use of ellipsometry for the measurement of the thickness of films is well-known (see, for instance, R. M. A. Azzam and N. M. Bashara, "Ellipsometry and Polarized Light", North Holland, 1987). When ordinary, i.e., non-polarized, white light is sent through a polarizer, it emerges as linearly polarized light with its electric field vector aligned with an axis of the polarizer. Linearly polarized light can be defined by two vectors, i.e., the vectors parallel and perpendicular to the plane of incidence. Ellipsometry is based on the change in polarization that occurs when a beam of polarized light is reflected from a medium. The change in polarization consists of two parts: a phase change and an amplitude change. The change in polarization is different for the portion of the incident radiation with the electric vector oscillating in the plane of incidence, and the portion of the incident radiation with the electric vector oscillating perpendicular to the plane of incidence. Ellipsometry measures the results of these two changes which are conveniently represented by an angle $\Delta$, which is the change in phase of the reflected beam $\rho$ from the incident beam; and an angle $\Psi$, which is defined as the arctangent of the amplitude ratio of the incident and reflected beam, i.e., $$\rho = \frac{r_p}{r_s} = \tan(\Psi)e^{j(\Delta)},$$

where $r_p$ is the p-component of the reflectance, and $r_s$ is the s-component of the reflectance. The angle of incidence and reflection are equal, but opposite in sign, to each other and may be chosen for convenience. Since the reflected beam is fixed in position relative to the incident beam, ellipsometry is an attractive technique for in-situ control of processes which take place in a chamber.

For example, U.S. Pat. No. 5,739,909 by Blayo et. al. teaches a method for using spectroscopic ellipsometry to measure linewidths by directing an incident beam of polarized light at a periodic structure. A diffracted beam is detected and its intensity and polarization are determined at one or more wavelengths. This is then compared with either pre-computed libraries of signals or to experimental data to extract linewidth information. While this is a non-destructive test, it does not provide profile information, but yields only a single number to characterize the quality of the fabrication process of the periodic structure. Another method for characterizing features of a patterned material is disclosed in U.S. Pat. No. 5,607,800 by D. H. Ziger. According to this method, the intensity, but not the phase, of zeroth-order diffraction is monitored for a number of wavelengths, and correlated with features of the patterned material.

In order for these optical methods to be useful for extraction of detailed semiconductor profile information, there must be a way to theoretically generate the diffraction spectrum for a periodic grating. The general problem of electromagnetic diffraction from gratings has been addressed in various ways. One such method, referred to as "rigorous coupled-wave analysis" ("RCWA") has been proposed by Moharam and Gaylord. (See M. G. Moharam and T. K. Gaylord, "Rigorous Coupled-Wave Analysis of Planar-Grating Diffraction", J. Opt. Soc. Am., vol. 71, 811–818, July 1981; M. G. Moharam, E. B. Grann, D. A. Pommet and T. K. Gaylord, "Formulation for Stable and Efficient Implementation of the Rigorous Coupled-Wave Analysis of Binary Gratings", J. Opt. Soc. Am. A, vol. 12, 1068–1076, May 1995; and M. G. Moharam, D. A. Pommet, E. B. Grann and T. K. Gaylord, "Stable Implementation of the Rigorous Coupled-Wave Analysis for Surface-Relief Dielectric Gratings: Enhanced Transmittance Matrix Approach", J. Opt. Soc. Am. A, vol. 12, 1077–1086, May 1995.) RCWA is a non-iterative, deterministic technique that uses a state-variable method for determining a numerical solution. Several similar methods have also been proposed in the last decade. (See P. Lalanne and G. M. Morris, "Highly Improved Convergence of the Coupled-Wave Method for TM Polarization", J. Opt. Soc. Am. A, 779–784, 1996; L. Li and C. Haggans, "Convergence of the coupled-wave method for metallic lanelar diffraction gratings", J. Opt. Soc. Am. A, 1184–1189, June, 1993; G. Granet and B. Guizal, "Efficient Implementation of the Coupled-Wave Method for Metallic Lamelar Gratings in TM Polarization", J. Opt. Soc. Am. A, 1019–1023, May, 1996; U.S. Pat. No. 5,164,790 by McNeil, et al; U.S. Pat. No. 5,867,276 by McNeil, et al; U.S. Pat. No. 5,963,329 by Conrad, et al; and U.S. Pat. No. 5,739,909 by Blayo et al.)

Generally, an RCWA computation consists of four steps:

The grating is divided into a number of thin, planar layers, and the section of the ridge within each layer is approximated by a rectangular slab.

Within the grating, Fourier expansions of the electric field, magnetic field, and permittivity leads to a system of differential equations for each layer and each harmonic order.

Boundary conditions are applied for the electric and magnetic fields at the layer boundaries to provide a system of equations.

Solution of the system of equations provides the diffracted reflectivity from the grating for each harmonic order.

The accuracy of the computation and the time required for the computation depend on the number of layers into which the grating is divided and the number of orders used in the Fourier expansion.

The diffracted reflectivity information which results from an RCWA computation can be used to determine the details of the profile of a semiconductor device. Generally, reflectivities for a range of different possible profiles of a given semiconductor device are numerically calculated using RCWA and stored in a database library. Then, the actual diffracted reflectivity of the given device is measured as disclosed, for example, in co-pending U.S. patent application Ser. No. 09/764,780 for Caching of Intra-Layer Calculations for Rapid Rigorous Coupled-Wave Analyses filed Jan. 25, 2000 by the present inventors which is hereby incorporated in its entirety into the present specification, or X. Niu, N. Jakatdar, J. Bao and C. J. Spanos, "Specular Spectroscopic Scatterometry" IEEE Trans. on Semiconductor Manuf., vol. 14, no. 2, May 2001. The reflected phase and magnitude signals obtained, in the case of ellipsometry, and relative reflectance, in the case of reflectometry, are then compared to the library of profile-spectra pairs generated stored in the library. A phase and/or amplitude measurement will be referred to in the present specification as the "diffracted reflectivity." The matching algorithms that can be used for this purpose range from simple least squares approach, to a neural network approach that associates features of the signal with the profile through a non-linear relationship, to a principal component based regression scheme. Explanations of each of these methods is explained in numerous text books on these topics such as Chapter 14 of "Mathematical Statistics and Data Analysis" by John Rice, Duxbury Press and Chapter 4 of "Neural Networks for Pattern Recognition" by Christopher Bishop, Oxford University Press. The profile associated with the RCWA-generated diffracted reflectivity that most closely matches the measured diffracted reflectivity is determined to be the profile of the measured semiconductor device.

In semiconductor manufacturing, a number of processes may be used to produce a periodic structure having two materials in the periodic direction. In the present specification the "nominal" number of materials occurring in the periodic direction is considered to be the maximum number of materials that lie along any of the lines which pass through the periodic structure in the direction of the periodicity. Accordingly, structures having a nominal two materials in the periodic direction have at least one line along the direction of periodicity passing through two materials, and no lines along the direction of periodicity passing through more than two materials. Additionally, it should be noted that when specifying the nominal number of materials occurring along a periodic direction of a structure in the present specification, the gas, gases or vacuum in gaps between solid materials is considered to be one of the materials. For instance, it is not necessary that both materials occurring in the periodic direction of a nominal two material periodic structure be solids.

An example of a structure 100 with two materials in a layer is shown in the cross-sectional view of FIG. 1A, which shows two periods of length D of a periodic portion of the structure 100. The structure 100 consists of a substrate 105, with a thin film 110 deposited thereon, and a periodic structure on the film 110 which consists of a series of ridges 121 and grooves 122. In exemplary structure 100, each ridge 121 has a lower portion 131, a middle portion 132 and an upper portion 133. It should be noted that according to the terminology of the present invention, the lower, middle and upper portions 131–133 are not 'layers.' In exemplary structure 100 of FIG. 1A, the lower, middle and upper portions 131–133 are each composed of a different material. The direction of periodicity is horizontal on the page of FIG. 1A, and it can be seen that a line parallel to the direction of periodicity may pass through at most two different materials. For instance, a horizontal line passing through the middle portion 132 of one of the ridge structures 121, passes through the middle portion 132 of all of the ridge structures 121, and also passes through the atmospheric material 122. That is, there are two materials in that region. (It should be noted that a line which is vertical on the page of FIG. 1A can pass through more than two materials, such as a line passing through the lower, middle and upper portions 131–133 of a ridge structure, the thin film 110, and the substrate 105, but according to the terminology of the present specification this structure 100 is not considered to have a nominal three or more materials in the periodic direction.)

A close-up cross-sectional view of a ridge structure 121 is shown in FIG. 1B with the structure being sectioned into what are termed 'harmonic expansion layers' or simply 'layers' in the present specification. In particular, the upper portion 133 is sectioned into five harmonic expansion layers 133.1 through 133.5, the middle portion 132 is sectioned into nine harmonic expansion layers 132.1 through 132.9, the lower portion 131 is sectioned into six harmonic expansion layers 131.1 through 131.6, and five harmonic expansion layers 110.1 through 110.5 of the thin film 110 are shown. All layer boundaries are horizontal planes, and it should be understood that harmonic expansion layers 133.1–133.5, 132.1–132.9, 131.1–131.6 and 110.1–110.5 may have differing thicknesses. For clarity of depiction, the harmonic expansion layers 133.1–133.5, 132.1–132.9, 131.1–131.6 and 110.1–110.5 are not shown to extend into the atmospheric material, although they are considered to do so. As can be seen in FIG. 1A, a structure having two materials occurring in a periodic direction will necessarily have two materials in an harmonic expansion layer.

With respect to semiconductors having a periodic structure with a nominal two materials in periodic direction, it is often the case that the widths of the solid structures in the periodic direction is important to proper operation of the device being produced. For example, the width of a structure (such as a transistor gate) can determine how quickly or slowly a device will operate. Similarly, the width of a conductor can determine the resistance of the conductor, or the width of a gap between two conductors can determine the amount of current leakage. Furthermore, the geometry of a structure in the periodic direction can also impact the geometry of successive layers of the chip.

Because the characteristic dimension of a structure in a direction orthogonal to the normal vector of the substrate generally has the most impact on the operation of a device and the fabrication of the characteristic dimension in successive layers of the chip, that dimension is referred to as the "critical" dimension. Because of the importance of critical dimension, it is common to use both the RCWA techniques discussed above and various other types of microscopy (such as critical-dimension scanning electron microscopy, cross-sectional scanning electron microscopy, atomic force microscopy, and focused ion beam measurement) to measure critical dimensions. While these techniques can generally adequately measure critical dimensions of structures having a single solid material along a line in the periodic direction, none of these techniques can make accurate measurements of critical dimensions of multiple material components of structures when more than a single solid material occurs in the periodic direction. In particular, such techniques generally cannot make accurate measurements of materials having more than two materials in a periodic direction.

However, a process which is intended to produce a structure with only two materials per layer may have deviations which result in more than two materials in a layer. For example, in FIG. 2A a semiconductor device 810 is shown in which troughs 812 have been etched in a vertical portion 814, such as a series of ridges 815. Such a process nominally produces a structure having two materials along each line in the periodic direction: the solid material of the ridges 815 and the atmospheric material in the troughs 812. However, as shown in FIG. 2B, which illustrates a common manufacturing defect on semiconductor device 810, when etching the troughs 812, a thin polymer layer 818 can remain coated on the side and bottom walls of the troughs 812.

Therefore, device 810 has three materials along the line 820 in the periodic direction: the material of ridges 815, the material of polymer 818, and the atmospheric gas in trough 812. And, as noted above, techniques discussed above which can measure critical dimensions of periodic structures having a nominal two materials in the periodic direction cannot be used to accurately measure the dimensions of multiple solid materials within structures having more than two materials in the periodic direction. Specifically, techniques ordinarily used to measure the width of the ridges 815 will not yield an accurate measurement result when polymer 818 is present. This is because such techniques generally cannot distinguish between the material of ridges 815 and the material of polymer 818.

A second example of a structure which is intended to nominally have only two materials in the periodic direction but which, due to additional-material deviations, has more than two materials in the periodic direction can occur in performing chemical mechanical polishing ("CMP"), as is shown in FIG. 3A. FIG. 3A shows a semiconductor device 700 having a substrate 710 with a nitride layer 714 formed thereon. Troughs 712 are etched in the substrate 710 and nitride layer 714. Silicon dioxide plugs 716 are then placed in troughs 712. This results in a periodic structure which has either one or two materials in the periodic direction. In particular, the substrate material 710 and the material of the silicon dioxide plugs 716 fall along line 722; the material of nitride layer 714 and the material of the silicon dioxide plugs 716 fall along line 718; and the material of the substrate 710 falls along line 724.

After the silicon dioxide plugs 716 have been formed, such a device 700 would typically be further processed using a technique referred to as "shallow trench isolation CMP". This technique is intended to smooth the top face of the device so that the top of nitride layer 714 and the top of the silicon dioxide plugs 716 both come to the same level, shown by line 720. However, because silicon dioxide is softer than nitride, silicon dioxide plugs 716 will erode further than the nitride layer 714. This results in portions of silicon dioxide plugs 716 dipping below the top surface of the nitride layer, and is known as "dishing" of silicon dioxide plugs 716. And, as shown in FIG. 3A along line 718, near the top of the nitride layer 714, device 700 can has three materials occurring in the periodic direction: nitride, silicon dioxide and the atmospheric material in those regions where the dishing has resulted in the top surface 717 of the silicon dioxide plugs 716 being below the level of line 718.

This type of deviation is referred to in the present specification as a "transverse" deviation because it is transverse to the periodic direction of the structure and is transverse to what would generally be the direction along which the critical dimension is measured. That is, the deviation occurs in the direction normal to the face of device 700 (in a vertical direction in FIG. 3), rather than along the periodic direction. In contrast, the semiconductor manufacturing industry generally focuses on deviations in the critical dimension, such as T-topping discussed earlier. Accordingly, the idea of measuring the extent of any dishing occurring in a semiconductor manufacturing process has not generally arisen in the semiconductor fabrication industry since transverse deviations have not been considered to have substantial effects on the operation of devices or the fabrication of subsequent layers.

However, it is here predicted that with continuing technological innovations allowing the size of semiconductor devices to steadily shrink, the functioning of semiconductor devices will become increasingly dependent on precise fabrication control and metrology along the transverse direction, and precise fabrication and control of additional-material deviations. Furthermore, recently developed devices have been designed with their critical dimension (i.e., the dimension having the greatest effect on the operation of the device) along the normal to the substrate, i.e., along the direction that the present specification has previously referred to as the transverse direction. Therefore, it is here predicted that future generations of semiconductor systems will both have devices with their critical dimension parallel to the substrate, and devices with their critical dimension perpendicular to the substrate.

SUMMARY OF THE INVENTION

A method and system in accordance with the present invention allows measurement of semiconductor fabrication methods which ideally have only two materials along a line in a periodic direction, but which have deviations which result in more than two materials occurring along a line in a periodic direction.

A method for metrology of additional-material structural deviations of a nominal periodic structure by comparison of a measured diffraction spectrum from a target periodic structure with a calculated diffraction spectrum from a hypothetical deviated periodic structure, where the hypothetical deviated periodic structure is defined by applying the additional-material structural deviations to said nominal periodic structure. The hypothetical deviated periodic structure has a direction of periodicity x, a direction of essentially-infinite extension y which is orthogonal to the x direction, and a normal direction z which is orthogonal to both the x and y directions. A plurality of layers are defined parallel to an x-y plane. An x-z plane cross-section of the periodic structure is sectioned into a plurality of stacked rectangular sections such that only two materials from the nominal periodic structure are within each of the plurality of layers and at least three materials are within at least one of the plurality of layers in the hypothetical deviated periodic structure. A harmonic expansion of a function of the permittivity $\epsilon$ is performed along the direction of periodicity x for each of the layers, including the layer or layers in the hypothetical deviated periodic structure which include(s) at least three materials. Fourier space electromagnetic equations are then set up in each of the layers using the harmonic expansion of the function of the permittivity $\epsilon$ for each of the layers and Fourier components of electric and magnetic fields in each layer. The Fourier space electromagnetic equations are then coupled based on boundary conditions between the layers, and solved to provide the calculated diffraction spectrum.

In a second aspect of the present invention, generation of the diffracted reflectivity of a periodic grating to determine values of structural properties of the periodic grating includes dividing the periodic grating into a plurality of hypothetical layers at least one of which is formed across at least first, second and third materials in the periodic grating. Each hypothetical layer has its normal vector orthogonal to the direction of periodicity, and each hypothetical layer has one of a plurality of possible combinations of hypothetical values of properties for that hypothetical layer. Sets of hypothetical layer data are then generated. Each set of hypothetical layer data corresponds to a separate one of the plurality of hypothetical layers. The generated sets of hypothetical layer data are processed to generate the diffracted reflectivity that would occur by reflecting electromagnetic radiation off the periodic grating.

Preferably, each hypothetical layer is subdivided into a plurality of slab regions with each slab region corresponding to a separate material within the hypothetical layer. Also, preferably, generating sets of hypothetical layer data includes expanding the real space permittivity or the real space inverse permittivity of the hypothetical layers in a one-dimensional Fourier transformation along the direction of periodicity of the periodic grating. Preferably, the Fourier transform is formulated as a sum over boundaries between materials in each layer.

In a third aspect of the present invention, a method of generating an expression of the permittivity of a target periodic grating having more than two materials in a periodic direction for use in an optical profilometry formalism for determining a diffracted reflectivity of the target periodic grating includes dividing the target periodic grating into a plurality of hypothetical layers. At least one of the hypothetical layers is formed across each of at least a first, second and third material occurring along a line parallel to a direction of periodicity of the target periodic grating. At least one of the plurality of hypothetical layers is subdivided into a plurality of hypothetical slabs to generate a plurality of hypothetical boundaries. Each of the plurality of hypothetical boundaries corresponds to an intersection of at least one of the plurality of hypothetical layers with one of at least the first, second and third materials. A permittivity function is determined for each of the plurality of hypothetical layers. Then, a one-dimensional Fourier expansion of the permittivity function of each hypothetical layer is completed along the direction of periodicity of the target periodic grating by summing the Fourier components over the plurality of hypothetical boundaries to provide harmonic components of the at least one permittivity function. A permittivity harmonics matrix is then defined including the harmonic components of the Fourier expansion of the permittivity function.

A system of the present invention includes a microprocessor configured to perform the steps of the methods discussed above. Additionally, a computer readable storage medium in accordance with the present invention contains computer executable code for instructing a computer to operate to complete the steps of the methods discussed above.

BRIEF DESCRIPTION OF THE DRAWINGS

FIG. 1B is a close-up cross-sectional view of one of the ridges of FIG. 1A with the ridge being sectioned into layers.

FIG. 2A is a cross-sectional view of a semiconductor device having etched troughs and in which at most two materials occur along any line in the periodic direction.

FIG. 2B is a cross-sectional view of a the semiconductor device shown in FIG. 2A in which a residual polymer layer coats the etched troughs resulting in more than two materials unintentionally occurring along any line in the periodic direction.

DETAILED DESCRIPTION

The present invention relates to metrology of additional-material deviations and deviations in a direction transverse to the critical dimension using a diffraction calculation technique. A system and method in accordance with the present invention can be used for the measurement of one-dimensionally periodic surface profiles, particularly where the surface profile has three or more materials along at least one line in the periodic direction.

Figure 4:
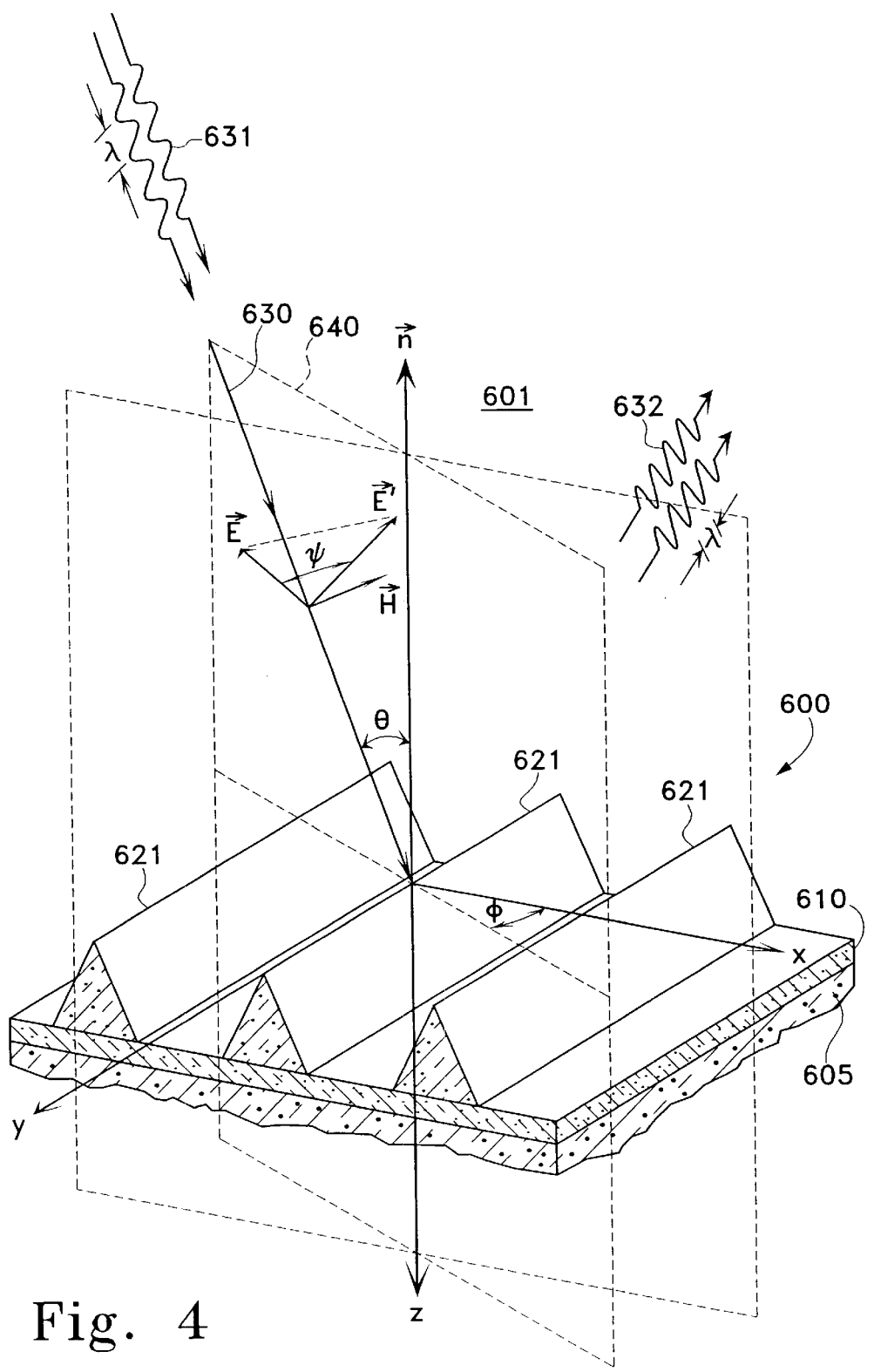
FIG. 4 shows a section of a diffraction grating labeled with variables used in a mathematical analysis in accordance with the present invention.

FIG. 4 is a diagram of a section of a periodic grating 600. The section of the grating 600 which is depicted includes three ridges 621 which are shown as having a triangular cross-section. It should be noted that the method of the present invention is applicable to cases where the ridges have shapes which are considerably more complex, and even to cases where the categories of "ridges" and "troughs" may be ill-defined. According to the lexography of the present specification, the term "ridge" will be used for one period of a periodic structure on a substrate. Each ridge 621 of FIG. 4 is considered to extend infinitely in the +y and −y directions, and an infinite, regularly-spaced series of such ridges 621 are considered to extend in the +x and −x directions. The ridges 621 are atop a deposited film 610, and the film 610 is atop a substrate 605 which is considered to extend semi-infinitely in the +z direction. The normal vector $\vec{n}$ to the grating is in the −z direction.

FIG. 4 illustrates the variables associated with a mathematical analysis of a diffraction grating according to the present invention. In particular:

θ is the angle between the Poynting vector of the incident electromagnetic radiation 631 and the normal vector $\vec{n}$ of the grating 600. The Poynting vector and the normal vector $\vec{n}$ define the plane of incidence 640.

φ is the azimuthal angle of the incident electromagnetic radiation 631, i.e., the angle between the direction of periodicity of the grating, which in FIG. 4 is along the x axis, and the plane of incidence 640. (For ease of presentation, in the mathematical analysis of the present specification the azimuthal angle φ is set to zero.)

ψ is the angle between the electric-field vector $\vec{E}$ of the incident electromagnetic radiation 631 and the plane of incidence 640, i.e., between the electric field vector $\vec{E}$ and its projection $\vec{E}'$ on the plane of incidence 640. When φ=0 and the incident electromagnetic radiation 631 is polarized so that ψ=π/2, the electric-field vector $\vec{E}$ is perpendicular to the plane of incidence 640 and the magnetic-field vector $\vec{H}$ lies in the plane of incidence 640, and this is referred to as the TE polarization. When φ=0 and the incident electromagnetic radiation 631 is polarized so that ψ=0, the magnetic-field vector $\vec{H}$ is perpendicular to the plane of incidence 640 and the electric-field vector $\vec{E}$ lies in the plane of incidence 640, and this is referred to as the TM polarization. Any planar polarization is a combination of in-phase TE and TM polarizations. The method of the present invention described below can be applied to any polarization which is a superposition of TE and TM polarizations by computing the diffraction of the TE and TM components separately and summing them. Furthermore, although the 'off-axis' φ≠0 case is more complex because it cannot be separated into TE and TM components, the present invention is applicable to off-axis incident radiation as well.

λ is the wavelength of the incident electromagnetic radiation 631.

Figure 1A:
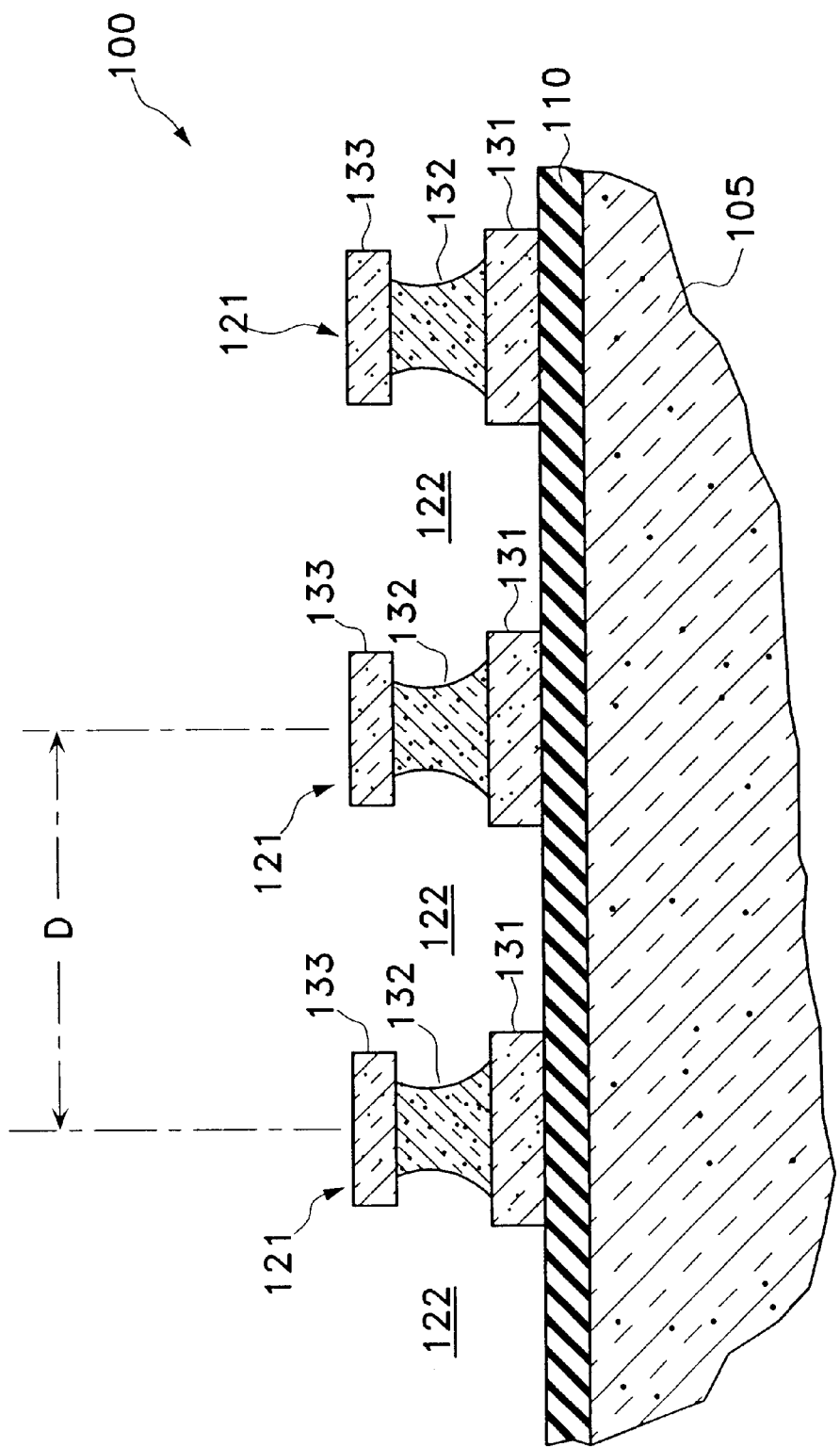
FIG. 1A is a cross-sectional view showing a periodic structure where there is a maximum of two materials along any line in the periodic direction.
Figure 3A:
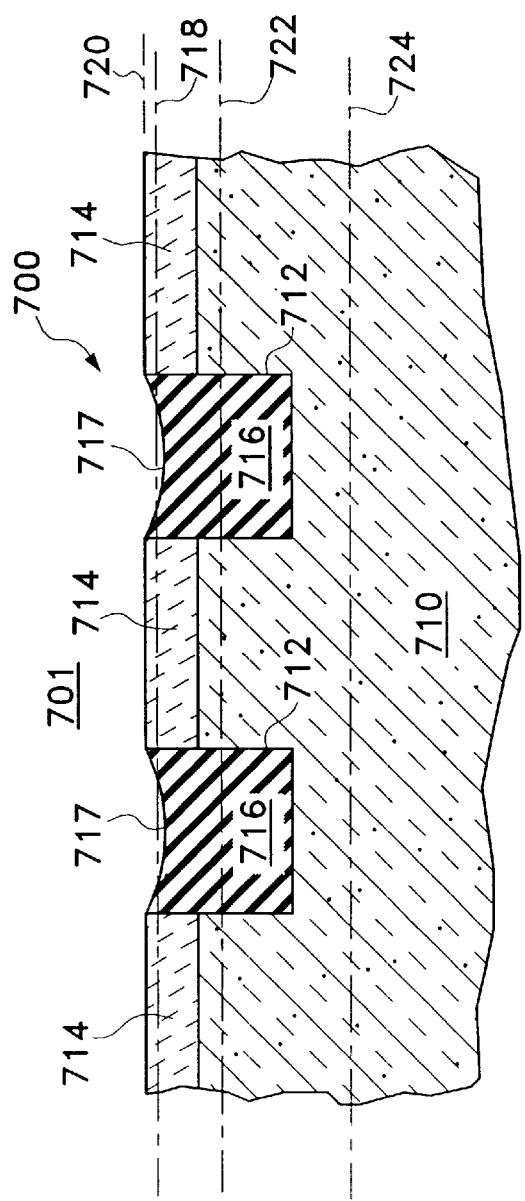
FIG. 3A is a cross-sectional view of a semiconductor device which includes transverse deviations resulting in more than two materials occurring a line in the periodic direction.
Figure 3B:
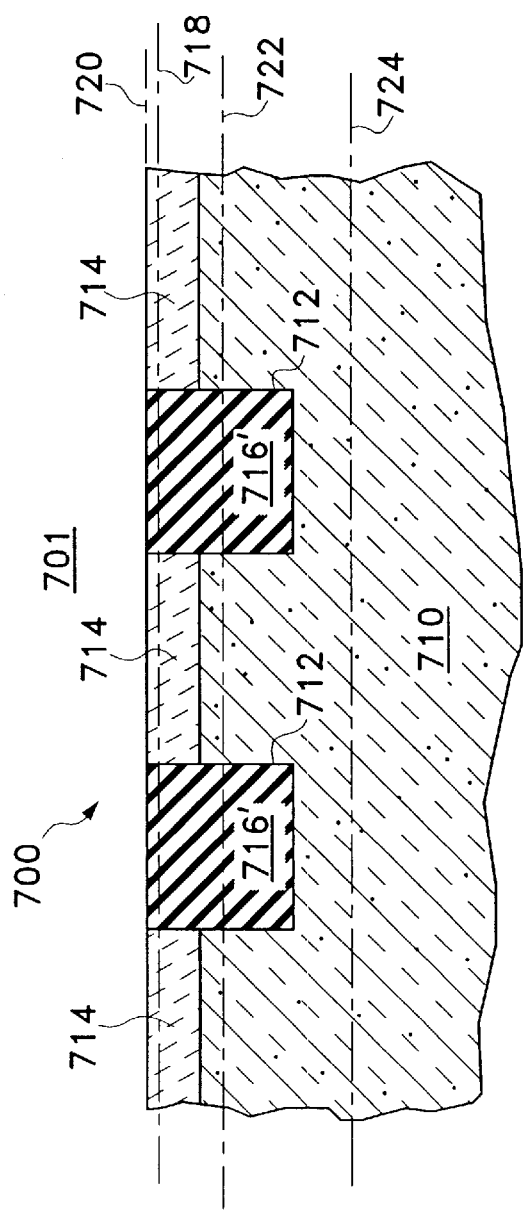
FIG. 3B is a cross-sectional view of the semiconductor device of FIG. 3A without the transverse deviations which result in more than two materials occurring along a line in the periodic direction.
Figure 5:
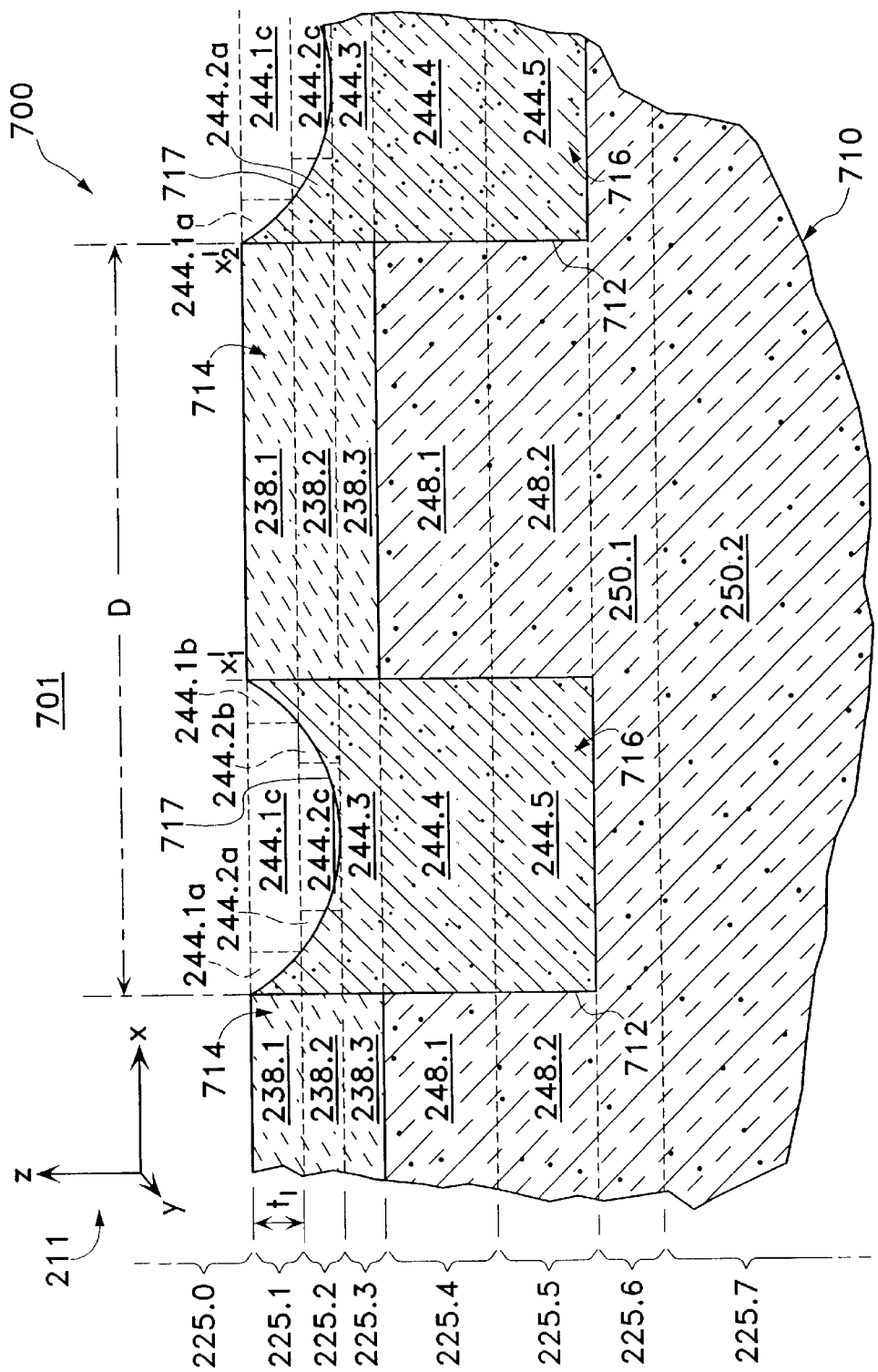
FIG. 5 is a cross-sectional view of the semiconductor shown in FIG. 3A sectioned into harmonic expansion layers and discretized into rectangular slabs in accordance with the present invention.

FIG. 5 illustrates division of the periodic structure of FIG. 3A into a plurality of expansion layers to allow a mathematical analysis of the diffraction grating in accordance with the present invention. In the coordinate system 211 shown in FIG. 5, the periodic direction is the x direction, the transverse direction is the z direction, and the y direction is a direction of essentially infinite extension orthogonal to the x direction and z direction normal to the page.

As described above in reference to FIG. 3A, the periodic structure 700 includes a substrate 710 with a nitride layer 714 formed thereon. Troughs 712 are etched in a periodic manner in the substrate 710 and nitride layer 714. Silicon dioxide plugs 716 are then placed in troughs 712. As explained in the Background section above, because silicon dioxide is softer than nitride, when a CMP process is applied to the semiconductor device, silicon dioxide plugs 216 will erode further than nitride layer 214. This results in portions of silicon dioxide plugs 216 dipping below the top surface of the nitride layer 714 and creating a transverse deviation. In particular, near the top surface of the nitride layer 714, the semiconductor device has three materials occurring along a line in the periodic direction: nitride, silicon dioxide and atmospheric gas.

FIG. 5 illustrates the variables associated with a mathematical description of the dimensions of exemplary grating 700 according to the present invention. The nominal profile of FIG. 5 (i.e., the profile that would occur in this case if there was no dishing) has one or two materials per layer: the material of the substrate 710 and the silicon dioxide of the plugs 716 in layers 225.4 and 225.5; the material of the substrate 710 in layers 225.6 and 225.7; the material of the substrate 710 and the nitride of the nitride layer 714 in layers 225.1, 225.2 and 225.3; and the material of the substrate 710 in layer 225.0. The dishing of the plugs 716 is considered to be an additional-material deviation prior to discretization. Also, atmospheric slabs 244.1c and 244.2c are considered to be additional-material deviations of the discretized profile. Accordingly, in layers 225.1 and 225.2 there are three materials: the atmospheric material in slabs 244.1c and 244.2c, the nitride in slabs 238.1 and 238.2, and the silicon dioxide in slabs 244.1a, 244.1b, 244.1b, and 244.2b.

Figure 6A:
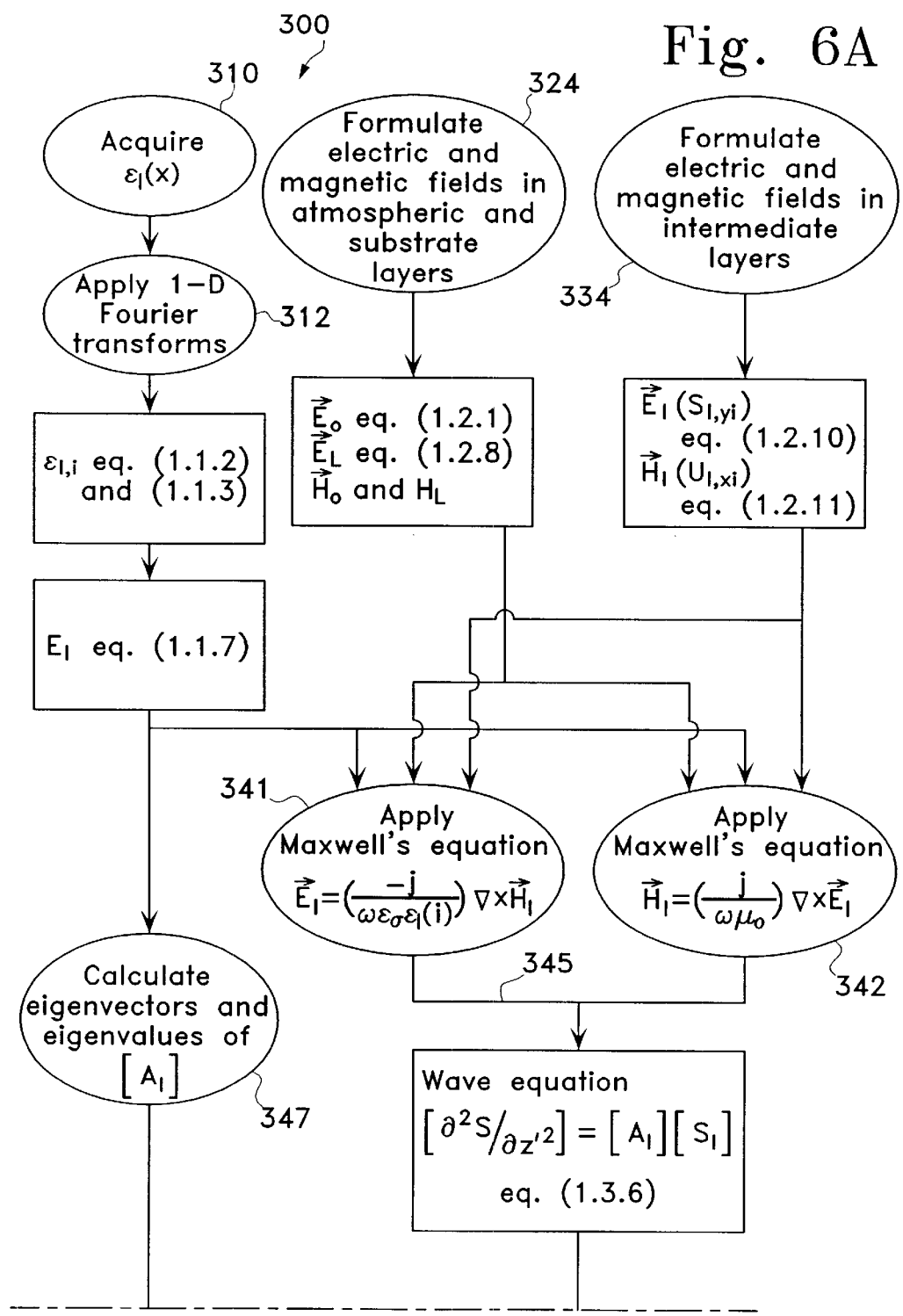
FIG. 6 shows a process flow of a TE-polarization rigorous coupled-wave analysis in accordance with the present invention.
Figure 7A:
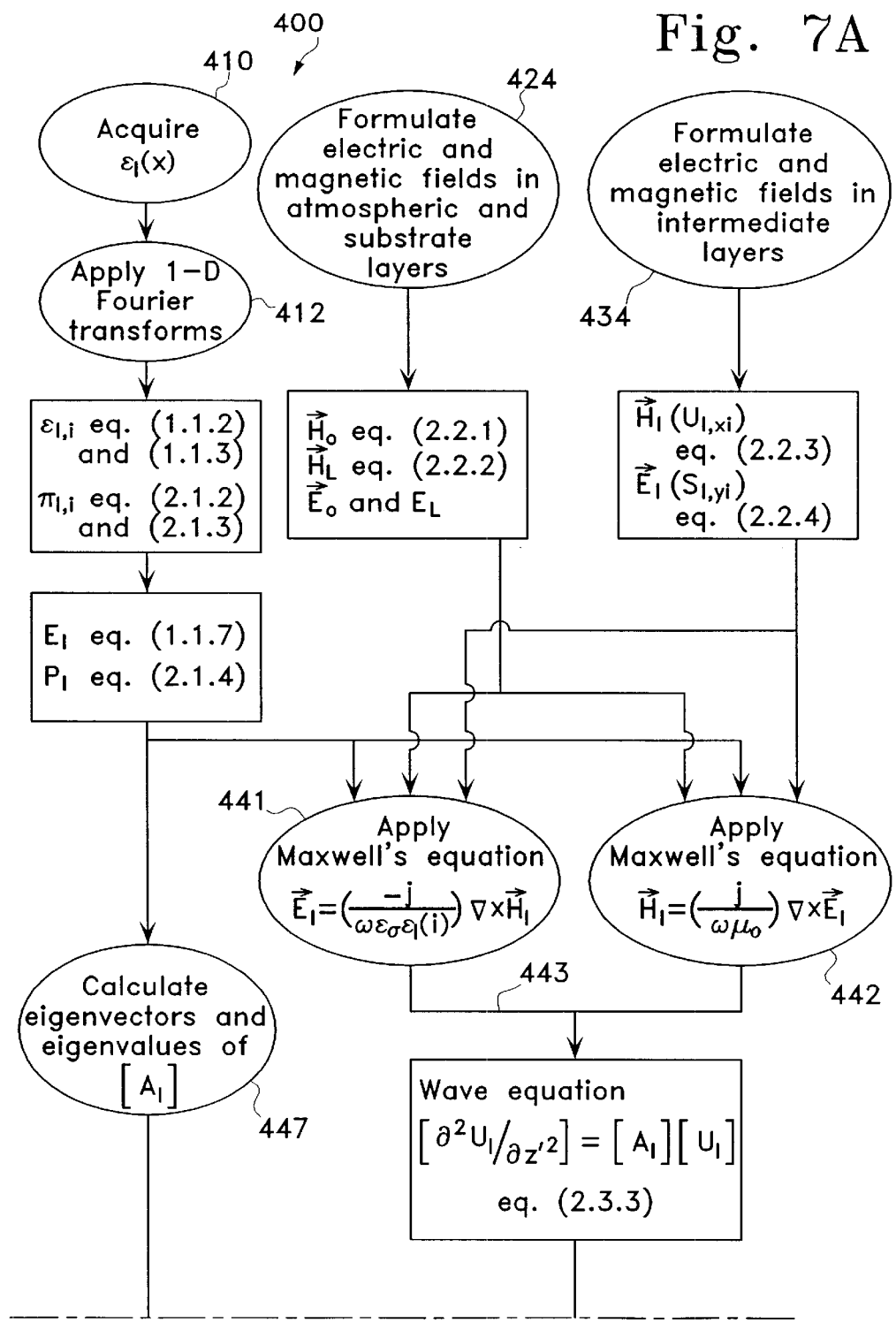
FIG. 7 shows a process flow for a TM-polarization rigorous coupled-wave analysis in accordance with the present invention.
Figure 9:
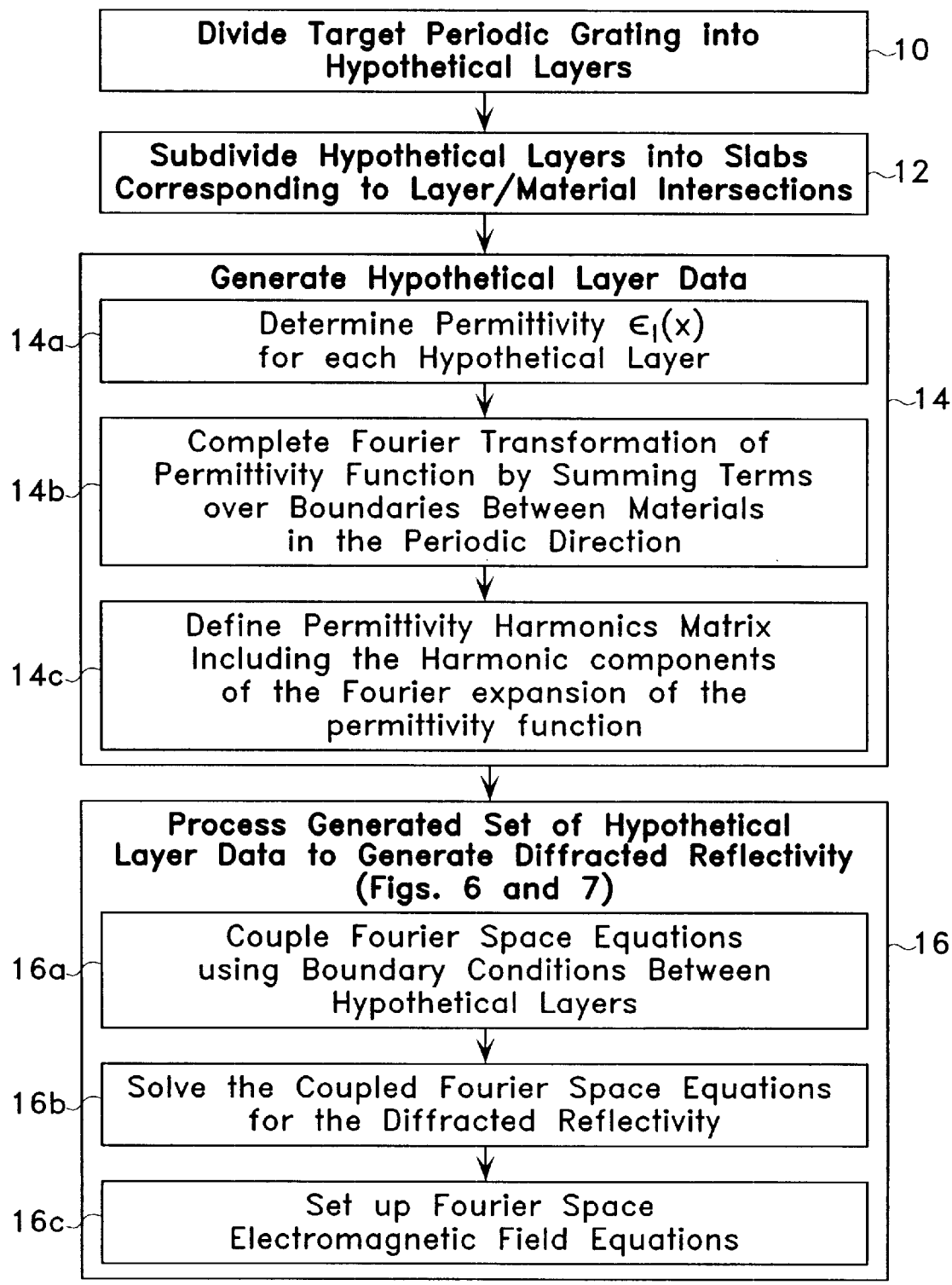
FIG. 9 is a flow chart illustrating a method of generating an expression of the permittivity of a target periodic grating having more than two materials in a periodic direction in accordance with the present invention.

FIG. 9 is a flow chart illustrating a method of generating a diffracted reflectivity of a target periodic grating, such as grating 700 of FIG. 5, having additional material deviations resulting in a grating with 2 or more materials occurring along a periodic direction. Specifically, FIG. 9 illustrates a method in accordance with the present invention for expressing the permittivity of a target periodic grating having 2 or more materials occurring along a periodic direction, this expression is referred to herein generally as hypothetical layer data. As expressed, this hypothetical layer data can be used to generate a theoretical or simulated diffracted reflectivity of the target periodic grating. FIGS. 6 and 7 illustrate the details of a method in accordance with the present invention of determining a theoretical diffracted reflectivity of a target periodic grating using the hypothetical layer data. FIG. 6 illustrates this process flow for TE-polarization rigorous coupled-wave analysis in accordance with the present invention and FIG. 7 illustrates this process flow for a TM-polarization rigorous coupled-wave analysis in accordance with the present invention.

Referring first to FIG. 9, in step 10, the target periodic grating 700 (shown in FIG. 5) is divided into hypothetical harmonic expansion layers. Referring again to FIG. 5, L+1 is the number of the harmonic expansion layers into which the system is divided. Harmonic expansion layers 0 and L are considered to be semi-infinite layers. Harmonic expansion layer 0 is an "atmospheric" layer 701, such as vacuum or air, which typically has a refractive index $n_o$ near unity. Harmonic expansion layer L is a "substrate" layer 710, which is typically silicon or germanium in semiconductor applications. In the case of the exemplary grating 700, there are eight harmonic expansion layers, with the atmospheric layer 701 above grating 700 being the zeroth harmonic expansion layer 225.0; the first and second harmonic expansion layers 225.1 and 225.2, respectively, containing a top portion of the nitride layer 714, the dished portion of the silicon dioxide plugs 712, and the atmospheric material; the third harmonic expansion layer 225.3 containing the bottom portion of the nitride layer 714, and a middle portion of the silicon dioxide plugs 712; the fourth and fifth harmonic expansion layers 225.4 and 225.5, respectively, containing the material of the substrate 710 and the bottom portion of the silicon dioxide plugs 716; and the sixth and seventh harmonic expansion layers 225.6 and 225.7 containing only the material of the substrate 710. (Generically or collectively, the harmonic expansion layers are assigned reference numeral 225, and, depending on context, "harmonic expansion layers 225" may be considered to include the atmospheric layer 201 and/or the substrate 205.) As shown in FIG. 5, the harmonic expansion layers are formed parallel to the direction of periodicity of the grating 700. It is also considered, however, that the layers form an angle with the direction of periodicity of the grating being measured.

Referring again to FIG. 9, after dividing grating 700 into the hypothetical harmonic expansion layers as described above, in step 12, the hypothetical harmonic expansion layers are further divided into slabs defined by the intersections of the harmonic expansion layers with the materials forming the periodic grating. As shown in FIG. 5, the section of each material within each intermediate harmonic expansion layers 225.1 through 225.(L−1) is approximated by a planar slabs of rectangular cross-section 238.1, 238.2, 238.3, 248.1, 248.2, 244.1a, 244.1c, 244.1b, 244.2a, 244.2c, 244.2b, 244.3, 244.4, 244.5, 250.1, and 250.2. The top and bottom surfaces of each slab are located at the boundaries between harmonic expansion layers. The side surfaces of each slab are vertical and are located at the boundary between materials when that boundary is vertical, or across the boundary between materials when that boundary is not vertical. For instance, as shown in FIG. 5, slab 244.1a has its left sidewall at the boundary between the nitride layer 714 and the plug 716. The right wall of slab 244.1a crosses the boundary between the plug 716 and the atmospheric material at a point partway between leftmost edge of that boundary and rightmost edge of that boundary. Similarly, slab 244.1b has its right sidewall at the boundary between the nitride layer 714 and the plug 716, and the left wall of slab 244.1b crosses the boundary between the plug 716 and the atmospheric material at a point partway between leftmost edge of that boundary and rightmost edge of that boundary. Between slabs 244.1a and 244.1b is slab 244.1c. The left sidewall of slab 244.1c is coincident with the right sidewall of slab 244.1a, and the right sidewall of slab 244.1c is coincident with the left sidewall of slab 244.1b. Clearly, any geometry of exemplary grating 700 with a cross-section which does not consist solely of vertical and horizontal borders can be better approximated using a greater number of harmonic expansion layers 225. For example, in practice, the portion of exemplary grating 700 in harmonic expansion layers 225.1 and 225.2 might be divided into a larger number of harmonic expansion layers so that the vertical sidewalls across the curved dishing surface 717 would be better approximated. However, for the sake of clarity, this region of exemplary grating is divided into only two harmonic expansion layers 225.1 and 225.2.

Other parameters shown in FIG. 5 are as follows:

D is the periodicity length or pitch, i.e., the length between equivalent points on pairs of adjacent ridges.

$x^{(l)}_k$ is the x coordinate of the starting border of the kth material in the lth layer, and $x^{(l)}_{k-1}$ is the x coordinate of the ending border of the kth material in the lth layer, so that $x^{(l)}_k - x^{(l)}_{k-1}$ is the width of the kth slab in the lth layer. For example, as shown in FIG. 5, $x^{(l)}_2 - x^{(l)}_1$ is the width of the nitride slab 238.1.

$t_l$, is the thickness of the lth layer 225.1 for 1<l<(L−1). The thicknesses $t_l$ of the layers 225 are chosen so that (after the discretization of the profile) every vertical line segment within each layer 225 passes through only a single material. For instance, prior to discretization a vertical line in the region of slab 244.1a would pass through the boundary 717 between the atmospheric material and the silicon dioxide. However, upon discretization, where that region is replaced by a slab 244.1a of silicon dioxide, any vertical line in that region only passes through the silicon dioxide $n_k$ is the index of refraction of the kth material in grating 700.

In determining the diffraction generated by grating 700, as discussed in detail below, a Fourier space version of Maxwell's equations is used. Referring again to FIG. 9, to generate these equations, in step 14, hypothetical layer data is generated by completing a harmonic expansion of a function of the permittivities of the materials in the target periodic grating. In Step 14a of FIG. 9 (step 310 of FIG. 6 for TE polarization and step 410 of FIG. 7 for TM polarization) the permittivities $\epsilon_l(x)$ for each layer l are determined or acquired as is known by those skilled in the art and disclosed, for example, in U.S. patent application Ser. No. 09/728,146 filed Nov. 28, 2000 entitled Profiler Business Model, by the present inventors which is incorporated herein by reference in its entirety. A one-dimensional Fourier transformation of the permittivity $\epsilon_l(x)$ or the inverse permittivity $\pi_l(x)=1/\epsilon_l(x)$ of each layer l is performed in step 14b or FIG. 9 (step 312 of FIG. 6 and step 412 of FIG. 7) along the direction of periodicity, x, of the periodic grating 700 to provide the harmonic components of the permittivity $\epsilon_{l,i}$, or the harmonic components of the inverse permittivity $\pi_{l,i}$, where i is the order of the harmonic component. In particular, the real-space permittivity $\epsilon_l(x)$ of the lth layer is related to the permittivity harmonics $\epsilon_{l,i}$ of the lth layer by $$\varepsilon_l(x) = \sum_{i=-\infty}^{\infty} \varepsilon_{l,i} \exp\left(j\frac{2\pi i}{D}x\right). \tag{1.1.1}$$

Therefore, via the inverse transform, $$\varepsilon_0 = \sum_{k=1}^{r} n_k^2 x_{k-1} - \frac{x_k}{D}, \quad (1.1.2)$$

and for i not equal to zero, $$\varepsilon_{l,i} = \sum_{k=1}^{r} \frac{n_k^2}{-ji2\pi}\left[\left(\cos\left(\frac{2i\pi}{D}x_k\right) - \cos\left(\frac{2\pi i}{D}x_{k-1}\right)\right) - j\left(\sin\left(\frac{2i\pi}{D}x_k\right) - \sin\left(\frac{2i\pi}{D}x_{k-1}\right)\right)\right]. \quad (1.1.3)$$

where the sum is over the number r of borders and $n_k$ is the index of refraction of the material between the kth and the (k−1)th border and j is the imaginary number defined as the square root of −1. Similarly, the inverse of the permittivity, $\pi_{l,i}$, of the lth layer is related to the inverse-permittivity harmonics $\pi_{l,i}$ of the lth layer by $$\pi_l(x) = \sum_{i=-\infty}^{\infty} \pi_{l,i} \exp\left(j\frac{2\pi i}{D}x\right). \quad (1.1.4)$$

Therefore, via the inverse transform, $$\pi_0 = \sum_{k=1}^{r} n_k^{-2} x_{k-1} - \frac{x_k}{D}, \quad (1.1.5)$$

and for i not equal to zero, $$\pi_{l,i} = \sum_{k=1}^{r} \frac{n_k^{-2}}{-ji2\pi}\left[\left(\cos\left(\frac{2i\pi}{D}x_k\right) - \cos\left(\frac{2\pi i}{D}x_{k-1}\right)\right) - j\left(\sin\left(\frac{2i\pi}{D}x_k\right) - \sin\left(\frac{2i\pi}{D}x_{k-1}\right)\right)\right]. \quad (1.1.6)$$

where the sum is over the number r of borders and $n_k$ is the index of refraction of the material between the kth and the (k−1)th border and j is the imaginary number defined as the square root of −1. It is important to note that equations for the harmonic components of the permittivity ε or inverse permittivity π provided by the prior art are formulated as a sum over materials, and are only directed toward situations where each harmonic expansion layer has only one or two materials. In contrast, equations (1.1.2) and (1.1.3) and equations (1.1.5) and (1.1.6) are formulated as sums over the boundaries between different materials occurring in the periodic direction, and can handle geometries with any number of materials in a harmonic expansion layer.

As such, the system and method of the present invention is not only applicable to the semiconductor device 700 shown in FIG. 5, but also to devices exhibiting other types of deviations, such as semiconductor device 810 shown in FIG. 2B which includes a polymer layer.

Figure 8:
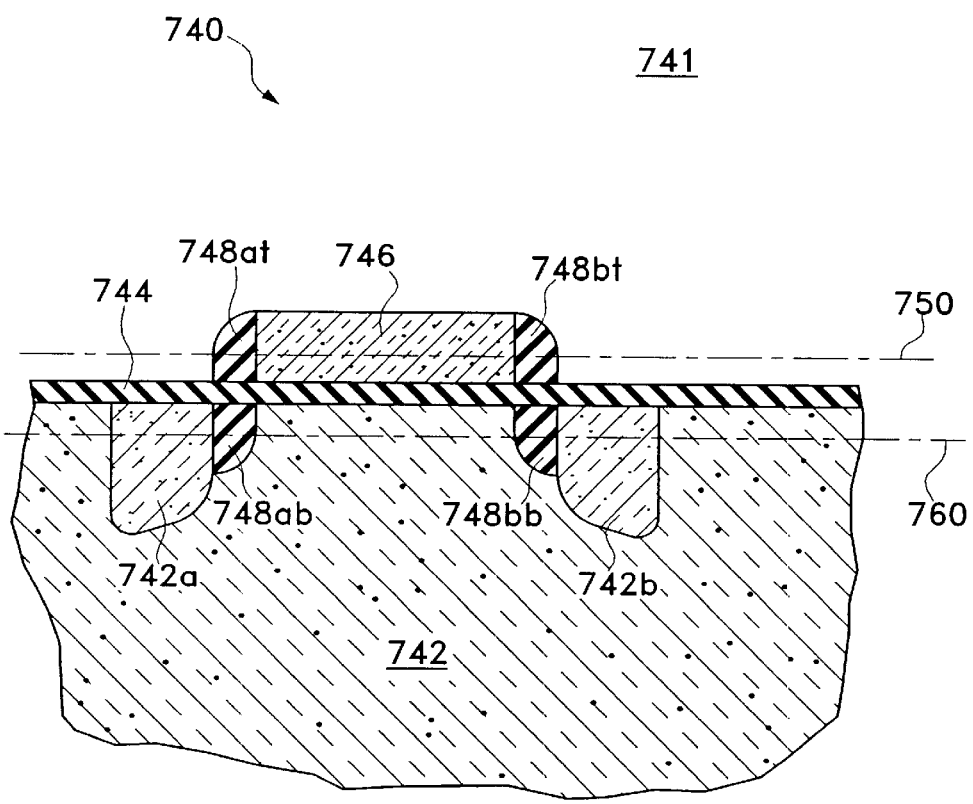
FIG. 8 is a cross-sectional view of a drain region of a semiconductor device illustrating formation of spacers in a lightly doped drain structure and having more than two materials along a line in the periodic direction.

Additionally, the system and method of the present invention could be used to measure structural dimensions of a periodic grating which by design have three or more materials occurring along a line in a periodic direction. One example of such a device is a field effect transistor 740 shown in FIG. 8 having a source 742a, a drain 742b, and a gate 746. The gate 746 is placed on top of a insulating oxide barrier layer 744 which coats the substrate 742. A voltage applied to the gate 746 produces an electric field in the region between the source 742a and the drain 742b which strongly affects current flow between the source 742a and the drain 742b. A top left spacer 748at is formed on the left side of the gate 746 on top of the barrier layer 744, a top right spacer 748bt is formed on the right side of the gate 746 on top of the barrier layer 744, a bottom left spacer 748ab is formed on the left side of the gate 746 below the barrier layer 744 and to the right of the source 742a, and a bottom right spacer 748bb is formed on the right side of the gate 746 below the barrier layer 744 and to the left of the drain 742b. The lower spacers 748ab and 748bb reduce the magnitude of electric field gradients in the regions near the source 742a and 742b and below the barrier layer 744, thereby preventing the amount of current which "jumps" through the barrier layer 744. The sizes and shapes of spacers 748 impacts the operation of device 740. If the spacers 748at, 748ab, 748bt and 748bb are too large, the operation of device 740 can be too slow. However, if the lower spacers 748ab and 748bb are too small, current leakage through the barrier layer 744 can occur, resulting in defective operation. Accordingly, it can be important to monitor the width of spacers 748. It should be noted that three materials lie along line 750: the material in the atmosphere 741, the material of the top spacers 748at and 748bt, and the material of the gate 746. Similarly, four materials lie along line 760: the material of the substrate 742, the material of the lower spacers 748ab and 748bb, the material of the source 742a, and the material of the drain 742b.

The method disclosed herein of describing a periodic grating such as a semiconductor device by dividing the grating into layers as discussed above and shown in FIG. 5, and expanding the permittivity of a periodic grating such as grating 700 as shown in equations (1.1.1) through (1.1.3), or expanding the inverse permittivity as shown in equations (1.1.4) through (1.1.6), can be used with any optical profilometry formalism for determining a diffracted reflectivity that uses a Fourier transform of the permittivity or inverse permittivity.

Referring again to FIG. 9, in step 16, the sets of hypothetical layer data generated as described above are processed to generate the diffracted reflectivity. This step involves three general sub-steps: First, in sub-step 16a, Fourier space electromagnetic field equations are set up in each of the hypothetical layers using the harmonic expansion of the permittivity function. Second, in sub-step 16b, these Fourier space equations are coupled using boundary conditions between harmonic expansion layers. Finally, in sub-step 16c, the coupled Fourier space equations are solved to provide the diffracted reflectivity. Each of these sub-steps is explained in detail below with reference to the corresponding step in the flow charts of FIGS. 6 and 7.

To set up the Fourier space electromagnetic field equations, it is convenient to define the (2o+1)×(2o+1) Toeplitz-form, permittivity harmonics matrix $E_l$ in step 14c of FIG. 9. This permittivity harmonics matrix includes the harmonic components of the Fourier Expansion of the permittivity $\epsilon_l(x)$ and is defined as:

$$E_l = \begin{bmatrix} \varepsilon_{l,0} & \varepsilon_{l,-1} & \varepsilon_{l,-2} & \cdots & \varepsilon_{l,-2o} \\ \varepsilon_{l,1} & \varepsilon_{l,0} & \varepsilon_{l,-1} & \cdots & \varepsilon_{l,-(2o-1)} \\ \varepsilon_{l,2} & \varepsilon_{l,1} & \varepsilon_{l,0} & \cdots & \varepsilon_{l,-(2o-2)} \\ \cdots & \cdots & \cdots & \cdots & \cdots \\ \varepsilon_{l,2o} & \varepsilon_{l,(2o-1)} & \varepsilon_{l,(2o-2)} & \cdots & \varepsilon_{l,0} \end{bmatrix}. \quad (1.1.7)$$

A similar permittivity harmonics matrix is defined below in equation (2.1.4) which includes the harmonic components of the Fourier expansion of the inverse permittivity $\pi_l(X)$.

As will be seen below, to perform a TE-polarization calculation where oth-order harmonic components of the electric field $\vec{E}$ and magnetic field $\vec{H}$ are used, it is necessary to use harmonics of the permittivity $\epsilon_{l,h}$ up to order 2o.

For the TE polarization, in the atmospheric layer the electric field $\vec{E}$ is formulated (324) as $$\vec{E}_{0,y} = \exp(-jk_0n_0(\sin\theta x + \cos\theta z)) + \sum_i R_i \exp(-j(k_{xi}x - k_{0,zi}z)), \quad (1.2.1)$$

where the term on the left of the right-hand side of equation (1.2.1) is an incoming plane wave at an angle of incidence $\theta$, the term on the right of the right-hand side of equation (1.2.1) is a sum of reflected plane waves and $R_i$ is the magnitude of the ith component of the reflected wave, and the wave vectors $k_0$ and $(k_{xi}, k_{0,zi})$ are given by $$k_0 = \frac{2\pi}{\lambda} = \omega(\mu_0\varepsilon_0)^{1/2}, \quad (1.2.2)$$

$$k_{xi} = k_0\left(n_0\sin(\theta) - i\left(\frac{\lambda}{D}\right)\right), \text{ and} \quad (1.2.3)$$

$$k_{0,zi} = \begin{cases} k_0(n_I^2 - (k_{xi}/k_0)^2)^{1/2} \\ -jk_0(n_I^2 - (k_{xi}/k_0)^2)^{1/2} \end{cases} \quad (1.2.4)$$

where the value of $k_{0,zi}$ is chosen from equation (1.2.4), i.e., from the top or the bottom of the expression, to provide $\text{Re}(k_{0,zi})-\text{Im}(k_{0,zi})>0$. This insures that $k_{0,zi}^2$ has a positive real part, so that energy is conserved. It is easily confirmed that in the atmospheric layer, the reflected wave vector $(k_{xi}, k_{0,zi})$ has a magnitude equal to that of the incoming wave vector $k_0n_0$. The magnetic field $\vec{H}$ in the atmospheric layer is generated from the electric field $\vec{E}$ by Maxwell's equation (1.3.1) provided below.

The x-components $k_{xi}$ of the outgoing wave vectors satisfy the Floquet condition (which is also called Bloch's Theorem, see Solid State Physics, N. W. Ashcrof and N. D. Mermin, Saunders College, Philadelphia, 1976, pages 133–134) in each of the layers containing the periodic ridges, and therefore, due to the boundary conditions, in the atmospheric layer and the substrate layer as well. That is, for a system having an n-dimensional periodicity given by $$f(\vec{r}) = f\left(\vec{r} + \sum_{i=1}^{n} m_i \vec{d}_i\right), \quad (1.2.5)$$

where $\vec{d}_i$ are the basis vectors of the periodic system, and $m_i$ takes on positive and negative integer values, the Floquet condition requires that the wave vectors $\vec{k}$ satisfy $$\vec{k} = \vec{k}_0 + 2\pi\sum_{i=1}^{n} m_i \vec{b}_i, \quad (1.2.6)$$

where $\vec{b}_i$ are the reciprocal lattice vectors given by $$(\vec{b}_i \cdot \vec{d}_j) = \delta_{ij}, \quad (1.2.7)$$

$\vec{k}_0$ is the wave vector of a free-space solution, and $\delta_{ij}$ is the Kronecker delta function. In the case of the layers of the periodic grating of FIGS. 6A and 6B which have the single reciprocal lattice vector $\vec{b}$ is $\hat{x}/D$, thereby providing the relationship of equation (1.2.3).

It may be noted that the formulation given above for the electric field in the atmospheric layer, although it is an expansion in terms of plane waves, is not determined via a Fourier transform of a real-space formulation. Rather, the formulation is produced (step 324) a priori based on the Floquet condition and the requirements that both the incoming and outgoing radiation have wave vectors of magnitude $n_0k_0$. Similarly, the plane wave expansion for the electric field in the substrate layer is produced (step 324) a priori. In the substrate layer, the electric field $\vec{E}$ is formulated (step 324) as a transmitted wave which is a sum of plane waves-where the x-components $k_{xi}$ of the wave vectors $(k_{xi}, k_{0,zi})$ satisfy the Floquet condition, i.e., $$\vec{E}_{L,y} = \sum_i T_i \exp\left(-j\left(k_{xi}x + k_{L,zi}\left(z - \sum_{l=1}^{L-1} t_l\right)\right)\right), \quad (1.2.8)$$

where $$k_{L,zi} = \begin{cases} k_0(n_L^2 - (k_{xi}/k_0)^2)^{1/2} \\ -jk_0(n_L^2 - (k_{xi}/k_0)^2)^{1/2} \end{cases} \quad (1.2.9)$$

where the value of $k_{L,zi}$ is chosen from equation (1.2.9), i.e., from the top or the bottom of the expression, to provide $\text{Re}(k_{L,zi})-\text{Im}(k_{L,zi})>0$, insuring that energy is conserved.

The plane wave expansions for the electric and magnetic fields in the intermediate layers 225.1 through 225.(L−1) of FIG. 5 are also, referring again to FIG. 6, produced (step 334) a priori based on the Floquet condition. The electric field $\vec{E}_{l,y}$ in the lth layer is formulated (step 334) as a plane wave expansion along the direction of periodicity, $\hat{x}$, i.e., $$\vec{E}_{l,y} = \sum_i S_{l,yi}(z)\exp(-jk_{xi}x), \quad (1.2.10)$$

where $S_{l,yi}(z)$ is the z-dependent electric field harmonic amplitude for the lth layer and the ith harmonic. Similarly, the magnetic field $\vec{H}_{l,y}$ in the lth layer is formulated (step 334) as a plane wave expansion along the direction of periodicity, $\vec{x}$, i.e., $$\vec{H}_{l,x} = -j\left(\frac{\varepsilon_0}{\mu_0}\right)^{1/2}\sum_i U_{l,xi}(z)\exp(-jk_{xi}x), \quad (1.2.11)$$

where $U_{l,xi}(z)$ is the z-dependent magnetic field harmonic amplitude for the lth layer and the ith harmonic.

According to Maxwell's equations, the electric and magnetic fields within a layer are related by $$\vec{H}_l = \left(\frac{j}{\omega\mu_0}\right)\nabla \times \vec{E}_l, \quad (1.3.1)$$

and $$\vec{E}_l\left(\frac{-j}{\omega\varepsilon_0\varepsilon_l(x)}\right)\nabla \times \vec{H}_l. \quad (1.3.2)$$

As discussed above with respect to FIG. 9, in sub-step 16b these Fourier space equations are coupled using boundary conditions between the harmonic expansion layers. Applying (step 342) the first Maxwell's equation (1.3.1) to equations (1.2.10) and (1.2.11) provides a first relationship between the electric and magnetic field harmonic amplitudes $S_l$ and $U_l$ of the lth layer:

$$\frac{\partial S_{l,yi}(z)}{\partial z} = k_0 U_{l,xi}, \tag{1.3.3}$$

Similarly, applying (step 341) the second Maxwell's equation (1.3.2) to equations (1.2.10) and (1.2.11), and taking advantage of the relationship $$k_{xi} + \frac{2\pi h}{D} = k_{x(i-h)} \tag{1.3.4}$$

which follows from equation (1.2.3), provides a second relationship between the electric and magnetic field harmonic amplitudes $S_l$ and $U_l$ for the lth layer:

$$\frac{\partial U_{l,xi}}{\partial z} = \left(\frac{k_{xi}^2}{k_0}\right) S_{l,yi} - k_0 \sum_p \varepsilon_{(i-p)} S_{l,yp}. \tag{1.3.5}$$

While equation (1.3.3) only couples harmonic amplitudes of the same order i, equation (1.3.5) couples harmonic amplitudes $S_l$ and $U_l$ between harmonic orders. In equation (1.3.5), permittivity harmonics $\varepsilon_i$ from order −2o to +2o are required to couple harmonic amplitudes $S_l$ and $U_l$ of orders between −o and +o.

Combining equations (1.3.3) and (1.3.5) and truncating the calculation to order o in the harmonic amplitude S provides (step 345) a second-order differential matrix equation having the form of a wave equation, i.e., $$\left[\frac{\partial^2 S_{l,y}}{\partial z'^2}\right] = [A_l][S_{l,y}], \tag{1.3.6}$$

z′ =$k_0$ z, the wave-vector matrix $[A_l]$ is defined as $$[A_l] = [K_x]^2 - [E_l], \tag{1.3.7}$$

where $[K_x]$ is a diagonal matrix with the (i,i) element being equal to $(k_{xi}/k_0)$, the permittivity harmonics matrix $[E_l]$ is defined above in equation (1.1.4), and $[S_{l,y}]$ and $[\partial^2 S_{l,y}/\partial z'^2]$ are column vectors with indices i running from −o to +o, i.e., $$[S_{l,y}] = \begin{bmatrix} S_{l,y,(-0)} \\ \vdots \\ S_{l,y,0} \\ \vdots \\ S_{l,y,0} \end{bmatrix}, \tag{1.3.8}$$

By writing (step 350) the homogeneous solution of equation (1.3.6) as an expansion in pairs of exponentials, i.e., $$S_{l,yi}(z) = \sum_{m=1}^{2o+1} w_{l,i,m}[c1_{l,m}\exp(-k_0 q_{l,m}z) + c2_{l,m}\exp(k_0 q_{l,m}(z-t_l))], \tag{1.3.9}$$

its functional form is maintained upon second-order differentiation by z′, thereby taking the form of an eigen equation. Solution (step 347) of the eigen equation $$[A_l]W_l = [\tau_l][W_l], \tag{1.3.10}$$

provides (step 348) a diagonal eigenvalue matrix $[\tau_l]$ formed from the eigenvalues $\tau_{l,m}$ of the wave-vector matrix $[A_l]$, and an eigenvector matrix $[W_l]$ of entries $w_{l,i,m}$, where $w_{l,i,m}$ is the ith entry of the mth eigenvector of $[A_l]$. A diagonal root-eigenvalue matrix $[Q_l]$ is defined to be diagonal entries $q_{l,i}$ which are the positive real portion of the square roots of the eigenvalues $\tau_{l,i}$. The constants c1 and c2 are, as yet, undetermined.

By applying equation (1.3.3) to equation (1.3.9) it is found that $$U_{l,xi}(z) = \sum_{m=1}^{2o+1} v_{l,i,m}[-c1_{l,m}\exp(-k_0 q_{l,m}z) + c2_{l,m}\exp(k_0 q_{l,m}(z-t_l))] \tag{1.3.11}$$

where $v_{l,i,m} = q_{l,m} w_{l,i,m}$. The matrix $[V_l]$, to be used below, is composed of entries $v_{l,i,m}$.

The constants c1 and c2 in the homogeneous solutions of equations (1.3.9) and (1.3.11) are determined by applying (step 355) the requirement that the tangential electric and magnetic fields be continuous at the boundary between each pair of adjacent layers 225.l and 225.(l+1). At the boundary between the atmospheric layer and the first layer 225.1, continuity of the electric field $E_y$ and the magnetic field $H_x$ requires $$\begin{bmatrix} \delta_{i0} \\ jn_0\cos(\theta)\delta_{i0} \end{bmatrix} + \begin{bmatrix} I \\ -jY_0 \end{bmatrix} R = \begin{bmatrix} W_1 & W_1 X_1 \\ V_1 & -V_1 X_1 \end{bmatrix} \begin{bmatrix} c1_1 \\ c2_1 \end{bmatrix} \tag{1.4.1}$$

where $Y_0$ is a diagonal matrix with entries $(k_{0,zi}/k_0)$, $X_l$ is a diagonal layer-translation matrix with elements $\exp(-k_0 q_{l,m} t_l)$, R is a vector consisting of entries from $R_{-o}$ to $R_{+o}$ and $c1_1$ and $c2_1$ are vectors consisting of entries from $c1_{1,0}$ and $c1_{1,2o+1}$, and $c2_{1,0}$ and $c2_{1,2o+1}$, respectively. The top half of matrix equation (1.4.1) provides matching of the electric field $E_y$ across the boundary of the atmospheric layer 225.0 and the first layer 225.1, the bottom half of matrix equation (1.4.1) provides matching of the magnetic field $H_x$ across the layer boundary between layer 225.0 and layer 125.1, the vector on the far left is the contribution from the incoming radiation, shown in FIG. 4, in the atmospheric layer 701 of FIG. 5, the second vector on the left is the contribution from the reflected radiation 132, shown in FIG. 4, in the atmospheric layer 701 of FIG. 5, and the portion on the right represents the fields $E_y$ and $H_x$ in the first layer 225.1 of FIG. 5.

At the boundary between adjacent intermediate layers 225.l and 225.(l+1), continuity of the electric field $E_y$ and the magnetic field $H_x$ requires $$\begin{bmatrix} W_{l-1} X_{l-1} & W_{l-1} \\ W_{l-1} X_{l-1} & -V_{l-1} \end{bmatrix} \begin{bmatrix} c1_{l-1} \\ c2_{l-1} \end{bmatrix} = \begin{bmatrix} W_l & W_l X_l \\ V_l & -V_l X_l \end{bmatrix} \begin{bmatrix} c1_l \\ c2_l \end{bmatrix}, \tag{1.4.2}$$

where the top and bottom halves of the vector equation provide matching of the electric field $E_y$ and the magnetic field $H_x$, respectively, across the l−1/l layer boundary.

At the boundary between the (L−1)th layer 225.(L−1) and the substrate layer, continuity of the electric field $E_y$ and the magnetic field $H_x$ requires $$\begin{bmatrix} W_{L-1} X_{L-1} & W_{L-1} \\ V_{L-1} X_{L-1} & -V_{L-1} \end{bmatrix} \begin{bmatrix} c1_{L-1} \\ c2_{L-1} \end{bmatrix} = \begin{bmatrix} I \\ jY_L \end{bmatrix} T, \tag{1.4.3}$$

where, as above, the top and bottom halves of the vector equation provides matching of the electric field $E_y$ and the magnetic field $H_x$, respectively. In contrast with equation (1.4.1), there is only a single term on the right since there is no incident radiation in the substrate.

Referring again to FIG. 6, matrix equation (1.4.1), matrix equation (1.4.3), and the (L−1) matrix equations (1.4.2) can be combined (step 360) to provide a boundary-matched system matrix equation $$\begin{bmatrix} -I & W_1 & W_1 X_1 & 0 & 0 & \cdots & & & \\ jY_0 & V_1 & -VX & 0 & 0 & \cdots & & & \\ 0 & -W_1 X_1 & -W_1 & W_2 & W_2 X_2 & 0 & 0 & \cdots & \\ 0 & -V_1 X_1 & V_1 & V_2 & -V_2 X_2 & 0 & 0 & \cdots & \\ 0 & 0 & & \ddots & & \ddots & & & \vdots \\ 0 & 0 & & & & & & & \\ & & \cdots & & & -W_{L-1} X_{L-1} & -W_{L-1} & I & \\ & & & & & -V_{L-1} X_{L-1} & V_{L-1} & jY_L \end{bmatrix} \begin{bmatrix} R \\ c1_1 \\ c2_1 \\ \vdots \\ \vdots \\ c1_{L-1} \\ c2_{L-1} \\ T \end{bmatrix} = \begin{bmatrix} \delta_{i0} \\ j\delta_{i0} n_0 \cos(\theta) \\ 0 \\ \vdots \\ \vdots \\ \vdots \\ 0 \end{bmatrix}, \quad (1.4.4)$$

As is well understood by those skilled in the art, this boundary-matched system matrix equation (1.4.4) may be solved (step 365) (sub-step 16c in the flow chart of FIG. 9) to provide the reflectivity $R_i$ for each harmonic order i. (Alternatively, the partial-solution approach described in "Stable Implementation of the Rigorous Coupled-Wave Analysis for Surface-Relief Dielectric Gratings: Enhanced Transmittance Matrix Approach", E. B. Grann and D. A. Pommet, *J Opt. Soc. Am. A*, vol. 12, 1077–1086, May 1995, can be applied to calculate either the diffracted reflectivity R or the diffracted transmittance T.)

As noted above any planar polarization is a combination of in-phase TE and TM polarizations. The method of the present invention can be applied to any polarization which is a superposition of TE and TM polarizations by computing the diffraction of the TE and TM components separately and summing them.

The method 400 of calculation for the diffracted reflectivity of TM-polarized incident electromagnetic radiation shown in FIG. 7 parallels that method 300 described above and shown in FIG. 6 for the diffracted reflectivity of TE-polarized incident electromagnetic radiation. Referring to FIG. 4, for TM-polarized incident radiation 631 the electric field vector $\vec{E}$ is in the plane of incidence 640, and the magnetic field vector $\vec{H}$ is perpendicular to the plane of incidence 640. (The similarity in the TE-and TM-polarization RCWA calculations and the application of the present invention motivates the use of the term 'electromagnetic field' in the present specification to refer generically to either or both the electric field and/or the magnetic field of the electromagnetic radiation.)

As above, once the permittivity $\epsilon_l(x)$ is determined or acquired (step 410), the permittivity harmonics $\epsilon_{l,i}$ are determined (step 412) using Fourier transforms according to equations (1.1.2) and (1.1.3), and the permittivity harmonics matrix $E_l$ is assembled as per equation (1.1.4). In the case of TM-polarized incident radiation, it has been found that the accuracy of the calculation may be improved by formulating the calculations using inverse-permittivity harmonics $\pi_{l,i}$, since this will involve the inversion of matrices which are less singular. In particular, the one-dimensional Fourier expansion (step 412) for the inverse of the permittivity $\epsilon_l(x)$ of the lth layer is given by $$\frac{1}{\epsilon_l(x)} = \sum_{i=-\infty}^{\infty} \pi_{l,i} \exp\left(j\frac{2\pi i}{D}x\right) \quad (2.1.1)$$

Therefore, via the inverse Fourier transform this provides $$\pi_{l,0} = \sum_{k=1}^{r} \frac{1}{n_k^2} x_k - \frac{x_{k-1}}{D}, \quad (2.1.2)$$

and for i not equal to zero, $$\pi_{l,i} = \sum_{k=1}^{r} \frac{1}{-ji2\pi} \frac{1}{n_k^2}\left(\left(\cos\left(\frac{2\pi i}{D}x_k\right) - \cos\left(\frac{2\pi i}{D}x_{k-1}\right)\right) - j\left(\sin\left(\frac{2\pi i}{D}x_k\right) - \sin\left(\frac{2\pi i}{D}x_{k-1}\right)\right)\right) \quad (2.1.3)$$

where the sum is over the number r of borders and $n_k$ is the index of refraction of the material between the kth and the (k−1)th border and j is the imaginary number defined as the square root of −1.

As noted above with respect to equations (1.1.1) through (1.1.3), (1.1.2.1) and (1.1.3.1), by describing a periodic grating such as a semiconductor device by dividing the grating into layers as discussed above and shown in FIG. 5, further subdividing the layers into areas where the layers intersect with one of the materials, and expanding the inverse permittivity of a periodic grating such as grating 700 as shown in equations (2.1.1) through (2.1.3), as described below, a method and system in accordance with the present invention can be used to determine the diffracted reflectivity of a semiconductor device having transverse or other defects, such as a polymer coating residue formed from an etching operation and illustrated in FIG. 2B, resulting in three or more materials per layer in a periodic direction. Additionally, the method disclosed herein of describing a periodic grating such as a semiconductor device by dividing the grating into layers as discussed above and shown in FIG. 5, and expanding the inverse permittivity of a periodic grating such as grating 700 as shown in equations (2.1.1) through (2.1.3) can be used with any optical profilometry formalism for determining a diffracted reflectivity that uses a Fourier transform of the inverse permittivity.

The inverse-permittivity harmonics matrix $P_l$ is defined as $$P_l = \begin{bmatrix} \pi_{l,0} & \pi_{l,-1} & \pi_{l,-2} & \cdots & \pi_{l,2o} \\ \pi_{l,1} & \pi_{l,0} & \pi_{l,-1} & \cdots & \pi_{l,-(2o-1)} \\ \pi_{l,2} & \pi_{l,1} & \pi_{l,0} & \cdots & \pi_{l,-(2o-2)} \\ \cdots & \cdots & \cdots & \cdots & \cdots \\ \pi_{l,2o} & \pi_{l,(2o-1)} & \pi_{l,(2o-2)} & \cdots & \pi_{l,0} \end{bmatrix}, \quad (2.1.4)$$

where 2o is the maximum harmonic order of the inverse permittivity $\pi_{l,i}$ used in the calculation. As with the case of the TE polarization, for electromagnetic fields $\vec{E}$ and $\vec{H}$ calculated to order o it is necessary to use harmonic components of the permittivity $\epsilon_{l,i}$ and inverse permittivity $\pi_{l,i}$ to order 2o.

In the atmospheric layer the magnetic field $\vec{H}$ is formulated (step 424) a priori as a plane wave incoming at an angle of incidence θ, and a reflected wave which is a sum of plane waves having wave vectors $(k_{xi}, k_{0,zi})$ satisfying the Floquet condition, equation (1.2.6). In particular, $$\vec{H}_{0,y} = \exp(-jk_0 n_0(\sin\theta x + \cos\theta z)) + \sum_i R_i \exp(-j(k_{xi}x - k_{0,zi}z)), \quad (2.2.1)$$

where the term on the left of the right-hand side of the equation is the incoming plane wave, and $R_i$ is the magnitude of the ith component of the reflected wave. The wave vectors $k_0$ and $(k_{xi}, k_{0,zi})$ are given by equations (1.2.2), (1.2.3), and (1.2.4) above, and, referring now to FIG. 5, the magnetic field $\vec{H}$ in the atmospheric layer 701 is generated from the electric field $\vec{E}$ by Maxwell's equation (1.3.2). In the substrate layer 710 the magnetic field $\vec{H}$ is, as shown in FIG. 6, formulated (step 424) as a transmitted wave which is a sum of plane waves where the wave vectors $(k_{xi}, k_{0,zi})$ satisfy the Floquet condition, equation (1.2.6), i.e., $$\vec{H}_{L,y} = \sum_i T_i \exp\left(-j\left(k_{xi}x + k_{L,zi}\left(z - \sum_{l=1}^{L-1} t_l\right)\right)\right), \quad (2.2.2)$$

where $k_{L,zi}$ is defined in equation (1.2.9). Again based on the Floquet condition, the magnetic field $\vec{H}_{l,y}$ in the lth layer is formulated (step 434) as a plane wave expansion along the direction of periodicity, $\hat{x}$, i.e., $$\vec{H}_{l,y} = \sum_i U_{l,yi}(z)\exp(-jk_{xi}x), \quad (2.2.3)$$

where $U_{l,yi}(z)$ is the z-dependent magnetic field harmonic amplitude for the lth layer and the ith harmonic. Similarly, the electric field $\vec{E}_{l,x}$ in the lth layer is formulated (step 434) as a plane wave expansion along the direction of periodicity, i.e., $$\vec{E}_{l,x} = j\left(\frac{\mu_0}{\epsilon_0}\right)^{1/2} \sum_i S_{l,xi}(z)\exp(-jk_{xi}x), \quad (2.2.4)$$

where $S_{l,xi}(z)$ is the z-dependent electric field harmonic amplitude for the lth layer and the ith harmonic.

Substituting equations (2.2.3) and (2.2.4) into Maxwell's equation (1.3.2) provides(step 441) a first relationship between the electric and magnetic field harmonic amplitudes $S_l$ and $U_l$ for the lth layer:

$$\frac{\partial [U_{l,yi}]}{\partial z'} = [E_l][S_{l,xi}]. \quad (2.3.1)$$

Similarly, substituting (2.2.3) and (2.2.4) into Maxwell's equation (1.3.1) provides (step 442) a second relationship between the electric and magnetic field harmonic amplitudes $S_l$ and $U_l$ for the lth layer:

$$\frac{\partial [S_{l,xi}]}{\partial z'} = ([K_x][P_l][K_x] - [I])[U_{l,y}]. \quad (2.3.2)$$

where, as above, $K_x$ is a diagonal matrix with the (i,i) element being equal to $(k_{xi}/k_0)$. In contrast with equations (1.3.3) and (1.3.5) from the TE-polarization calculation, non-diagonal matrices in both equation (2.3.1) and equation (2.3.2) couple harmonic amplitudes $S_l$ and $U_l$ between harmonic orders.

Combining equations (2.3.1) and (2.3.2) provides a second-order differential wave equation $$\left[\frac{\partial^2 U_{l,y}}{\partial z'^2}\right] = \{[E_l]([K_x][P_l][K_x] - [I])\}[U_{l,y}], \quad (2.3.3)$$

where $[U_{l,y}]$ and $[\partial^2 U_{l,y}/\partial z'^2]$ are column vectors with indices running from −o to +o, and the permittivity harmonics $[E_l]$ is defined above in equation (1.1.7), and $z'=k_0 z$. The wave-vector matrix $[A_l]$ for equation (2.3.3) is defined as $$[A_l]=[E_l]([K_x][P_l][K_x]-[I]). \quad (2.3.4)$$

If an infinite number of harmonics could be used, then the inverse of the permittivity harmonics matrix $[E_l]$ would be equal to the inverse-permittivity harmonics matrix $[P_l]$, and vice versa, i.e., $[E_l]^{-1}=[P_l]$, and $[P_l]^{-1}=[E_l]$. However, the equality does not hold when a finite number o of harmonics is used, and for finite o the singularity of the matrices $[E_l]^{-1}$ and $[P_l]$, and the singularity of the matrices $[P_l]^{-1}$ and $[E_l]$, will generally differ. In fact, it has been found that the accuracy of RCWA calculations will vary depending on whether the wave-vector matrix $[A_l]$ is defined as in equation (2.3.4), or $$[A_l]=[P_l]^{-1}([K_x][E_l]^{-1}[K_x]-[I]), \quad (2.3.5)$$

or $$[A_l]=[E_l]([K_x][E_l]^{-1}[K_x]-[I]). \quad (2.3.6)$$

It should also be understood that although the case where $$[A_l]=[P_l]^{-1}([K_x][P_l][K_x]-[I]) \quad (2.3.6')$$

does not typically provide convergence which is as good as the formulations of equation (2.3.5) and (2.3.6), the present invention may also be applied to the formulation of equation (2.3.6').

Regardless of which of the three formulations, equations (2.3.4), (2.3.5) or (2.3.6), for the wave-vector matrix $[A_l]$ is used, the solution of equation (2.3.3) is performed by writing (step 450) the homogeneous solution for the magnetic field harmonic amplitude $U_l$ as an expansion in pairs of exponentials, i.e., $$U_{l,yi}(z) = \sum_{m=1}^{2o+1} w_{l,i,m}[c1_{l,m}\exp(-k_o q_{l,m} z) + c2_{l,m}\exp(k_o q_{l,m}(z-t_l))]. \quad (2.3.7)$$

since its functional from is maintained upon second-order differentiation by z', and equation (2.3.3) becomes an eigen equation. Solution (step 447) of the eigen equation $$[A_l][W_l] = [\tau_l][W_l], \quad (2.3.8)$$

provides (step 448) an eigenvector matrix $[W_l]$ formed from the eigenvectors $w_{l,i}$ of the wave-vector matrix $[A_l]$, and a diagonal eigenvalue matrix $[\tau_l]$ formed from the eigenvalues $\tau_{l,i}$ of the wave-vector matrix $[A_l]$. A diagonal root-eigenvalue matrix $[Q_l]$ is formed of diagonal entries $q_{l,i}$ which are the positive real portion of the square roots of the eigenvalues $\tau_{l,i}$. The constants c1 and c2 of equation (2.3.7) are, as yet, undetermined.

By applying equation (1.3.3) to equation (2.3.5) it is found that $$S_{l,xi}(z) = \sum_{m=1}^{2o+1} v_{l,i,m}[-c1_{l,m}\exp(-k_0 q_{l,m} z) + c2_{l,m}\exp(k_0 q_{l,m}(z-t_l))] \quad (2.3.9)$$

where the vectors $v_{l,i}$ form a matrix $[V_l]$ defined as $$[V] = [E]^{-1}[W][Q] \quad (2.3.10)$$
when [A] is defined as in equation (2.3.4), $$[V] = [P][W][Q] \quad (2.3.11)$$
when [A] is defined as in equation (2.3.5), $$[V] = [E]^{-1}[W][Q] \quad (2.3.12)$$
when [A] is defined as in equation (2.3.6).

The formulation of equations (2.3.5) and (2.3.11) typically has improved convergence performance (see P. Lalanne and G. M. Morris, "Highly Improved Convergence of the Coupled-Wave Method for TM Polarization", J. Opt. Soc. Am. A, 779–784, 1996; and L. Li and C. Haggans, "Convergence of the coupled-wave method for metallic lamellar diffraction gratings", J. Opt. Soc. Am. A, 1184–1189, June 1993) relative to the formulation of equations (2.3.4) and (2.3.11) (see M. G. Moharam and T. K. Gaylord, "Rigorous Coupled-Wave Analysis of Planar-Grating Diffraction", J. Opt. Soc. Am., vol. 71, 811–818, July 1981).

The constants c1 and c2 in the homogeneous solutions of equations (2.3.7) and (2.3.9) are determined by applying (step 455) the requirement that the tangential electric and-tangential magnetic fields be continuous at the boundary between each pair of adjacent layers (125.l)/(125.(l+1)), when the materials in each layer non-conductive. The calculation of the present specification is straightforwardly modified to circumstances involving conductive materials, and the application of the method of the present invention to periodic gratings which include conductive materials is considered to be within the scope of the present invention. Referring to FIG. 5, at the boundary between the atmospheric layer 701 and the first layer 225.1, continuity of the magnetic field $H_y$ and the electric field $E_x$ requires $$\begin{bmatrix} \delta_{i0} \\ j\cos(\theta)\delta_{i0}/n_0 \end{bmatrix} + \begin{bmatrix} I \\ -jZ_0 \end{bmatrix} R = \begin{bmatrix} W_1 & W_1 X_1 \\ V_1 & -V_1 X_1 \end{bmatrix} \begin{bmatrix} c1_1 \\ c2_1 \end{bmatrix} \quad (2.4.1)$$

where $Z_0$ is a diagonal matrix with entries $(k_{0,zi}/n_0^2 k_0)$, $X_l$ is a diagonal matrix with elements $\exp(-k_0 q_{l,m} t_l)$, the top half of the vector equation provides matching of the magnetic field $H_y$ across the layer boundary, the bottom half of the vector equation provides matching of the electric field $E_x$ across the layer boundary, the vector on the far left is the contribution from incoming radiation in the atmospheric layer 701, the second vector on the left is the contribution from reflected radiation in the atmospheric layer 701, and the portion on the right represents the fields $H_y$ and $E_x$ in the first layer 225.1.

At the boundary between adjacent intermediate layers 225.1 and 225.(l+1), continuity of the electric field $E_y$ and the magnetic field $H_x$ requires $$\begin{bmatrix} W_{l-1} X_{l-1} & W_{l-1} \\ W_{l-1} X_{l-1} & -V_{l-1} \end{bmatrix} \begin{bmatrix} c1_{l-1} \\ c2_{l-1} \end{bmatrix} = \begin{bmatrix} W_l & W_l X_l \\ V_l & -V_l W_l \end{bmatrix} \begin{bmatrix} c1_l \\ c2_l \end{bmatrix}, \quad (2.4.2)$$

where the top and bottom halves of the vector equation provides matching of the magnetic field $H_y$ and the electric field $E_x$, respectively, across the layer boundary.

At the boundary between the (L−1)th layer 225.(L−1) and the substrate layer 710, continuity of the electric field $E_y$ and the magnetic field $H_x$ requires $$\begin{bmatrix} W_{L-1} X_{L-1} & W_{L-1} \\ V_{L-1} X_{L-1} & -V_{L-1} \end{bmatrix} \begin{bmatrix} c1_{L-1} \\ c2_{L-1} \end{bmatrix} = \begin{bmatrix} I \\ jZ_L \end{bmatrix} T, \quad (2.4.3)$$

where, as above, the top and bottom halves of the vector equation provides matching of the magnetic field $H_y$ and the electric field $E_x$, respectively. In contrast with equation (2.4.1), there is only a single term on the right in equation (2.4.3) since there is no incident radiation in the substrate 710.

Matrix equation (2.4.1), matrix equation (2.4.3), and the (L−1) matrix equations (2.4.2) can be combined (step 460) to provide a boundary-matched system matrix equation $$\begin{bmatrix} -I & W_1 & W_1X_1 & 0 & 0 & \cdots & & & \\ jZ_0 & V_1 & -VX & 0 & 0 & \cdots & & & \\ 0 & -W_1X_1 & -W_1 & W_2 & W_2X_2 & 0 & 0 & \cdots & \\ 0 & -V_1X_1 & V_1 & V_2 & -V_2X_2 & 0 & 0 & \cdots & \\ 0 & 0 & \ddots & & \ddots & & & \vdots & \\ 0 & 0 & & & & & & cl_{L-1} & \\ & & \cdots & & & -W_{L-1}X_{L-1} & -W_{L-1} & I & \\ & & & & & -V_{L-1}X_{L-1} & V_{L-1} & jZ_L \end{bmatrix} \begin{bmatrix} R \\ cl_1 \\ c2_1 \\ \vdots \\ \vdots \\ cl_{L-1} \\ c2_{L-1} \\ T \end{bmatrix} = \begin{bmatrix} \delta_{i0} \\ j\delta_{i0}\cos(\theta)/n_0 \\ 0 \\ \vdots \\ \vdots \\ \vdots \\ 0 \end{bmatrix},\quad (2.4.4)$$

As is well understood by those skilled in the art, the boundary-matched system matrix equation (2.4.4) may be solved (step 465) to provide the reflectivity R for each harmonic order i. (Alternatively, the partial-solution approach described in "Stable Implementation of the Rigorous Coupled-Wave Analysis for Surface-Relief Dielectric Gratings: Enhanced Transmittance Matrix Approach", E. B. Grann and D. A. Pommet, J Opt. Soc. Am. A, vol. 12, 1077–1086, May 1995, can be applied to calculate either the diffracted reflectivity R or the diffracted transmittance T.)

The matrix on the left in boundary-matched system matrix equations (1.4.4) and (2.4.4) is a square non-Hermetian complex matrix which is sparse (i.e., most of its entries are zero), and is of constant block construction (i.e., it is an array of sub-matrices of uniform size). The matrix can be stored in a database to provide computer access for solving for the diffracted reflectivity using numerical methods. As is well known by those skilled in the art, the matrix can be stored using the constant block compressed sparse row data structure (BSR) method (see S. Carney, M. Heroux, G. Li, R. Pozo, K. Remington and K. Wu, "A Revised Proposal for a Sparse BLAS Toolkit,"http://www.netlib.org, 1996). In particular, for a matrix composed of a square array of square sub-matrices, the BSR method uses five descriptors:

$B_{13}$LDA is the dimension of the array of sub-matrices;

O is the dimension of the sub-matrices;

VAL is a vector of the non-zero sub-matrices starting from the leftmost non-zero matrix in the top row (assuming that there is a non-zero matrix in the top row), and continuing on from left to right, and top to bottom, to the rightmost non-zero matrix in the bottom row (assuming that there is a non-zero matrix in the bottom row).

$COL_{13}$IND is a vector of the column indices of the sub-matrices in the VAL vector; and $ROW_{13}$PTR is a vector of pointers to those sub-matrices in VAL which are the first non-zero sub-matrices in each row.

For example, for the left-hand matrix of equation (1.4.4), $B_{13}$ LDA has a value of 2L, O has a value of 2o+1, the entries of VAL are $(-I, W_l, W_lX_l, jY_0, V_l, -V_lX_l, -W_lX1l, -W_l, W_2, W_2X_2, -V_lX_l, V_l, V_2, \ldots )$, the entries of $COL_{13}$IND are $(1, 2, 3, 1, 2, 3, 2, 3, 4, 5, 2, 3, 4, 5, \ldots )$, and the entries of $ROW_{13}$PTR are $(1, 4, 7, 11, \ldots )$.

As is well-known in the art of the solution of matrix equations, the squareness and sparseness of the left-hand matrices of equations (1.4.4) and (2.4.4) are used to advantage by solving equations (1.4.4) and (2.4.4) using the Blocked Gaussian Elimination (BGE) algorithm. The BGE algorithm is derived from the standard Gaussian Elimination algorithm (see, for example, Numerical Recipes, W. H. Press, B. P. Flannery, S. A. Teukolsky, and W. T. Vetterling, Cambridge University Press, Cambridge, 1986, pp. 29–38) by the substitution of sub-matrices for scalars. According to the Gaussian Elimination method, the left-hand matrix of equation (1.4.4) or (2.4.4) is decomposed into the product of a lower triangular matrix [L], and an upper triangular matrix [U], to provide an equation of the form $$[L][U][x]=[b], \qquad (3.1.1)$$

and then the two triangular systems $[U][x]=[y]$ and $[L][y]=[b]$ are solved to obtain the solution $[x]=[U]^{-1}[L]^{-1}[b]$, where, as per equations (1.4.4) and (2.4.4), [x] includes the diffracted reflectivity R.

Figure 10:
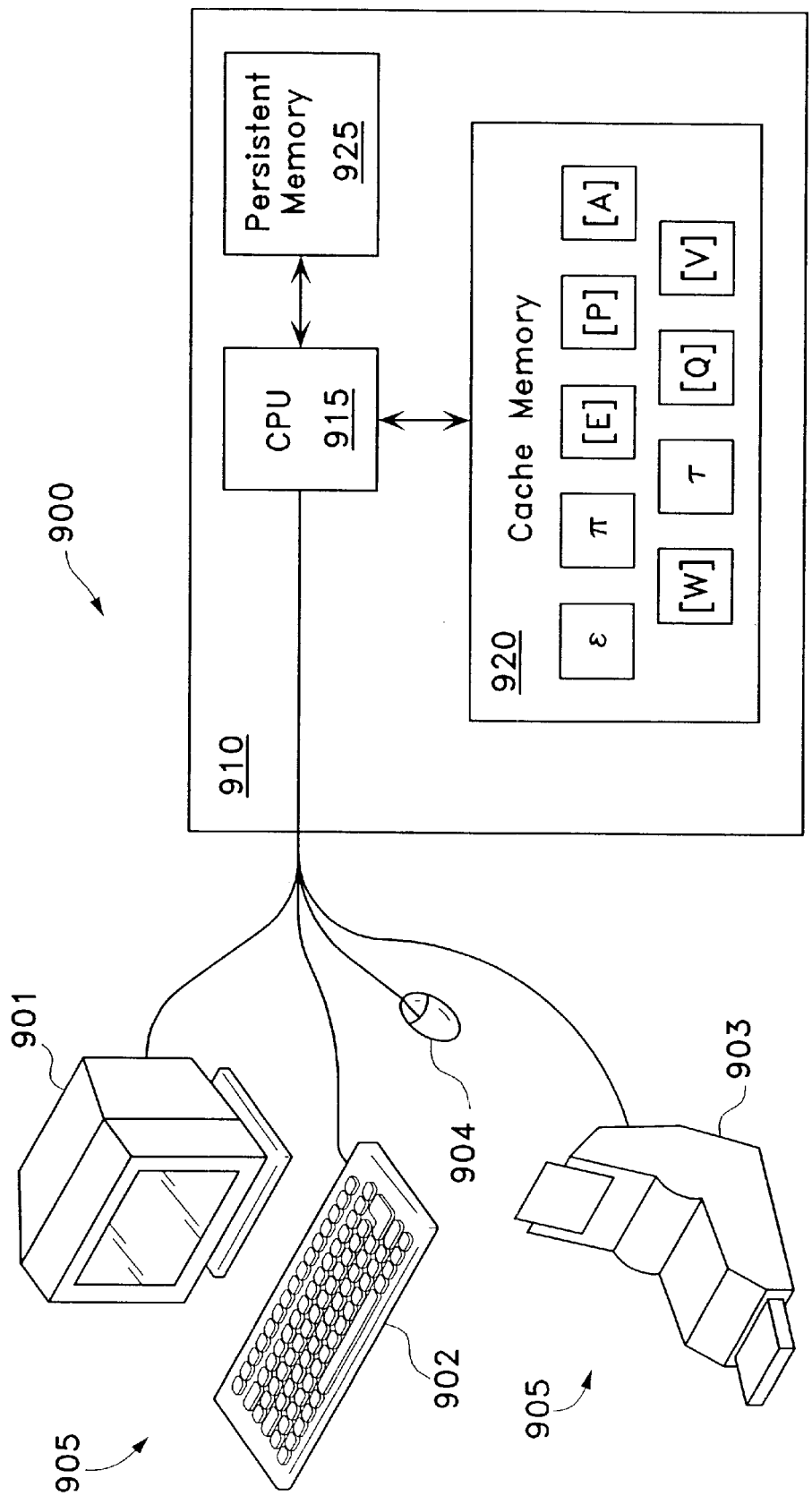
FIG. 10 illustrates a computer system for implementation of the computation portions of the present invention.

It should be noted that although the invention has been described in term of a method, as per FIGS. 6, 7 and 9, the invention may alternatively be viewed as an apparatus or system. Specifically, a shown in FIG. 10, the method of the present invention is preferably implemented on a computer system 900. Computer system 900 preferably includes information input/output (I/O) equipment 905, which is interfaced to a computer 910. Computer 910 includes a central processing unit (CPU) 915, a cache memory 920 and a persistent memory 925, which preferably includes a hard disk, floppy disk or other computer readable medium. The I/O equipment 905 typically includes a keyboard 902 and a mouse 904 for the input of information, a display device 901 and a printer 903. Many variations on computer system 900 are to be considered within the scope of the present invention, including, without limitation, systems with multiple I/O devices, multiple processors with a single computer, multiple computers connected by Internet linkages, and multiple computers connected by a local area network.

As is well understood by those skilled in the art, software computer code for implementing the steps of the method of the present invention illustrated in FIGS. 6, 7 and 9 and discussed in detail above can be stored in persistent memory 925. CPU 915 can then execute the steps of the method of the present invention and store results of executing the steps in cache memory 920 for completing diffracted reflectivity calculations as discussed above.

Referring to FIG. 4, it should also be understood that the present invention is applicable to off-axis or conical incident radiation 631 (i.e., the case where $\phi \neq 0$ and the plane of incidence 640 is not aligned with the direction of periodicity, $\hat{x}$, of the grating). The above exposition is straight forwardly adapted to the off-axis case since, as can be seen in "Rigorous Coupled-Wave Analysis of Planar-Grating Diffraction," M.

G. Moharam and T. K. Gaylord, J. Opt. Soc. Am., vol. 71, 811–818, July 1981, the differential equations for the electromagnetic fields in each layer have homogeneous solutions with coefficients and factors that are only dependent on intra-layer parameters and incident-radiation parameters.

It is also important to understand that, although the present invention has been described in terms of its application to the rigorous coupled-wave method of calculating the diffraction of radiation, the method of the present invention may be applied to any optical profilometry formalism where the system is divided into layers. The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are also to be considered within the scope of the present invention.

Additionally, the calculation of the present specification is applicable to circumstances involving conductive materials, or non-conductive materials, or both, and the application of the method of the present invention to periodic gratings which include conductive materials is considered to be within the scope of the present invention; the eigenvectors and eigenvalues of the matrix [A] may be calculated using another technique; the layer boundaries need not be planar and expansions other than Fourier expansions, such as Bessel or Legendre expansions, may be applied; the "ridges" and "troughs" of the periodic grating may be ill-defined; the method of the present invention may be applied to gratings having two-dimensional periodicity; the method of the present invention may be applied to any polarization which is a superposition of TE and TM polarizations; the ridged structure of the periodic grating may be mounted on one or more layers of films deposited on the substrate; the method of the present invention may be used for diffractive analysis of lithographic masks or reticles; the method of the present invention may be applied to sound incident on a periodic grating; the method of the present invention may be applied to medical imaging techniques using incident sound or electromagnetic waves; the method of the present invention may be applied to assist in real-time tracking of fabrication processes; the gratings may be made by ruling, blazing or etching; the method of the present invention may be utilized in the field of optical analog computing, volume holographic gratings, holographic neural networks, holographic data storage, holographic lithography, Zernike's phase contrast method of observation of phase changes, the Schlieren method of observation of phase changes, the central dark-background method of observation, spatial light modulators, acousto-optic cells, etc. In summary, it is intended that the scope of the present invention be defined by the claims appended hereto and their equivalents.

What is claimed is:

1. A method for metrology of additional-material structural deviations of a nominal periodic structure by comparison of a measured diffraction spectrum from a target periodic structure with a calculated diffraction spectrum from a hypothetical deviated periodic structure defined by applying said additional-material structural deviations to said nominal periodic structure, said hypothetical deviated periodic structure having a direction of periodicity x, a direction of essentially-infinite extension y orthogonal to said direction of periodicity x, and a normal direction z orthogonal to said direction of periodicity x and said direction of extension y, calculation of said calculated diffraction spectrum comprising the steps of:

defining a plurality of layers parallel to the x-y plane and discretizing an x-z plane cross-section of said periodic structure into a plurality of stacked rectangular sections such that only two materials from said nominal periodic structure are within each of said plurality of layers, and only a single material lies along each line along the normal direction z in each of said plurality of layers in said hypothetical deviated periodic structure, and at least three materials are within at least one of said plurality of layers in said hypothetical deviated periodic structure;

performing a harmonic expansion of a function of the permittivity $\epsilon$ along said direction of periodicity x for each of said layers including said at least one of said plurality of layers in said hypothetical deviated periodic structure having said at least three materials therein;

setting up Fourier space electromagnetic equations in said each of said layers using said harmonic expansion of said function of the permittivity $\epsilon$ for said each of said layers and Fourier components of electric and magnetic fields;

coupling said Fourier space electromagnetic equations based on boundary conditions between said layers; and solving said coupling of said Fourier space electromagnetic equations to provide said calculated diffraction spectrum.

2. The method of claim 1 wherein said harmonic expansion of said function of the permittivity $\epsilon$ along said direction of periodicity x for said at least one of said plurality of layers in said hypothetical deviated periodic structure having said at least three materials therein is given by $$\varepsilon_0 = \sum_{k=1}^{r} n_k^2 \frac{x_{k-1} - x_k}{D}$$

for the zeroth-order component, and $$\varepsilon_i = \sum_{k=1}^{r} \frac{jn_k^2}{i2\pi}\left[\left(\cos\left(\frac{2\pi i}{D}x_{k-1}\right) - \cos\left(\frac{2\pi i}{D}x_k\right)\right) - j\left(\sin\left(\frac{2\pi i}{D}x_{k-1}\right) - \sin\left(\frac{2\pi i}{D}x_k\right)\right)\right]$$

for the $i^{th}$-order harmonic component, where D is the pitch of said hypothetical deviated periodic structure, $n_k$ is the index of refraction of a material between material boundaries at $x_k$ and $x_{k-1}$, j is the imaginary number defined as the square root of −1, and there are r of said material boundaries within each period of said hypothetical deviated periodic structure.

3. The method of claim 1 wherein said only two materials from said nominal periodic structure within at least a single one of said plurality of layers are a solid and a non-solid.

4. The method of claim 1 wherein said periodic grating is a semiconductor grating with a critical dimension along said direction of periodicity x, and said additional-material structural deviations are deviations along said normal direction z.

5. The method of claim 4 wherein said additional-material structural deviations along said normal direction z result in an atmospheric region in what was a solid region of said nominal periodic structure.

6. The method of claim 1 wherein said periodic grating is a semiconductor grating with a critical dimension along said direction of periodicity x, and said additional-material structural deviations are deviations along said direction of periodicity x due to a polymer deposit.

7. The method of claim 1 wherein said periodic grating is a semiconductor grating and said additional-material structural deviations are purposefully included to provide a structure having particular electronic characteristics.

8. The method of claim 1 wherein an initial one of said layers is an atmospheric region, and a final one of said layers is a substrate.

9. The method of claim 1 wherein said calculation of said calculated diffraction spectrum is a rigorous coupled-wave calculation.

10. A method of generating the diffracted reflectivity associated with diffraction of electromagnetic radiation off a target periodic grating to determine structural properties of the target periodic grating, including:

dividing the target periodic grating into a plurality of hypothetical layers, at least one of the hypothetical layers formed across each of at least a first, second and third material, each of the at least first, second and third materials occurring along a direction of periodicity of the target periodic grating, each separate hypothetical layer having one of a plurality of possible combinations of hypothetical values of properties for that hypothetical layer;

generating sets of hypothetical layer data, each set of hypothetical layer data corresponding to a separate one of the plurality of hypothetical layers; and processing the generated sets of hypothetical layer data to generate the diffracted reflectivity that would occur by reflecting electromagnetic radiation off the periodic grating.

11. The method of claim 10 further including subdividing the hypothetical layers into a plurality of slabs, each slab corresponding to the intersection of one of the plurality of layers with one of at least the first, second and third materials.

12. The method of claim 11 wherein the step of dividing the target periodic grating into a plurality of hypothetical layers includes dividing the target periodic grating into a plurality of hypothetical layers which are parallel to the direction of periodicity of the target periodic grating.

13. The method of claim 10 wherein the step of generating sets of hypothetical layer data includes expanding at least one of either a function of a real space permittivity and a function of a real space inverse permittivity of the hypothetical layers in a one-dimensional Fourier transformation along the direction of periodicity of the target periodic grating to provide harmonic components of the at least one of either a function of a real space permittivity and a function of a real space inverse permittivity of the hypothetical layers.

14. The method of claim 10 wherein the step of generating sets of hypothetical layer data includes computing at least one of:

permittivity properties including a function of a permittivity $\epsilon_l(x)$ of each of the hypothetical layers of the target periodic grating, the harmonic components $\epsilon_{l,i}$ of the function of the permittivity $\epsilon_l(x)$, and a permittivity harmonics matrix $[E_l]$; and inverse-permittivity properties including a function of an inverse-permittivity $\pi_l(x)$ of each of the hypothetical layers of the target periodic grating, the harmonic components $\pi_{l,i}$ of the function of the inverse-permittivity $\pi_l(x)$, and an inverse-permittivity harmonics matrix $[P_l]$.

15. The method of claim 14 wherein the step of processing the generated sets of hypothetical layer data includes:

computing a wave-vector matrix $[A_l]$ by combining a series expansion of the electric field of each of the hypothetical layers of the target periodic grating with at least one of at least the permittivity harmonics matrix $[E_l]$ and inverse-permittivity harmonics matrix $[P_l]$; and computing the ith entry $w_{l,i,m}$ of the mth eigenvector of the wave-vector matrix $[A_l]$ and the mth eigenvalue $\tau_{l,m}$ of the wave-vector matrix $[A_l]$ to form an eigenvector matrix $[W_l]$ and a root-eigenvalue matrix $[Q_l]$.

16. The method of claim 10 wherein the step of generating sets of hypothetical layer data includes expanding one of at least a function of a permittivity $\epsilon_l(x)$ and a function of an inverse-permittivity $\pi_l(x)=1/\epsilon_l(x)$ of the at least one of the hypothetical layers formed across each of at least the first, second and third materials of the target periodic grating in a one-dimensional Fourier transformation, the expansion performed along the direction of periodicity of the target periodic grating according to at least one of:

$$\varepsilon_l(x) = \sum_{i=-\infty}^{\infty} \varepsilon_{l,i} \exp\left(j\frac{2\pi i}{D}x\right)$$

where $$\varepsilon_{l,i} = \sum_{k=1}^{r} \frac{n_k^2}{-ji2\pi}\left[\left(\cos\left(\frac{2i\pi}{D}x_k\right) - \cos\left(\frac{2\pi i}{D}x_{k-1}\right)\right) - j\left(\sin\left(\frac{2i\pi}{D}x_k\right) - \sin\left(\frac{2i\pi}{D}x_{k-1}\right)\right)\right]$$

and $$\pi_l(x) = \frac{1}{\varepsilon_l(x)} = \sum_{i=-\infty}^{\infty} \pi_{l,i} \exp\left(j\frac{2\pi i}{D}x\right)$$

where $$\pi_{l,i} = \sum_{k=1}^{r} \frac{1}{-ji2\pi}\frac{1}{n_k^2}\left(\left(\cos\left(\frac{2\pi i}{D}x_k\right) - \cos\left(\frac{2\pi i}{D}x_{k-1}\right)\right) - j\left(\sin\left(\frac{2\pi i}{D}x_k\right) - \sin\left(\frac{2\pi i}{D}x_{k-1}\right)\right)\right)$$

where D is the pitch of said hypothetical deviated periodic structure, $n_k$ is the index of refraction of a material between material boundaries at $x_k$ and $x_{k-1}$, j is the imaginary number defined as the square root of −1, and there are r of said material boundaries within each period of said hypothetical deviated periodic structure.

17. The method of claim 10, wherein the step of processing the generated sets of hypothetical layer data includes:

constructing a matrix equation from the intermediate data corresponding to the hypothetical layers of the target periodic grating; and solving the constructed matrix equation to determine the diffracted reflectivity value $R_i$ for each harmonic order i.

18. A method of generating the diffracted reflectivity associated with diffraction of electromagnetic radiation off a target periodic grating to determine structural properties of the target periodic grating, including:

dividing the target periodic grating into a plurality of hypothetical layers, at least one of the hypothetical layers formed across each of at least a first, second and third material occurring along a line parallel to a direction of periodicity of the target periodic grating;

performing an harmonic expansion of a function of the permittivity $\epsilon$ along the direction of periodicity of the target period grating for each of the hypothetical layers including the at least one of the plurality of layers formed across each of at least a first, second and third material;

setting up Fourier space electromagnetic equations in each of the hypothetical layers using the harmonic expansion of the function of the permittivity $\epsilon$ for said each of the hypothetical layers and Fourier components of electric and magnetic fields;

coupling the Fourier space electromagnetic equations based on boundary conditions between the layers; and solving the coupling of the Fourier space electromagnetic equations to provide a diffracted reflectivity.

19. The method of claim 18 further including subdividing at least one of the plurality of hypothetical layers into a plurality of hypothetical slabs, each hypothetical slab corresponding to an intersection of the at least one of the plurality of hypothetical layers with one of at least the first, second and third materials.

20. The method of claim 19 wherein the step of subdividing at least one of the hypothetical layers into a plurality of hypothetical slabs includes subdividing the at least one hypothetical layer into a plurality of hypothetical slabs such that only a single material lies along any line perpendicular to the direction of periodicity of the target periodic grating and normal to the target periodic grating.

21. The method of claim 18 wherein the harmonic expansion of the function of the permittivity along the direction of periodicity of the target periodic grating for the at least one of the hypothetical layers formed across each of at least the first, second and third material is given by:

$$\varepsilon_l(x) = \sum_{i=-\infty}^{\infty} \varepsilon_{l,i} \exp\left(j\frac{2\pi i}{D}x\right)$$

where, $$\varepsilon_0 = \sum_{k=1}^{r} n_k^2 \frac{x_{k-1} - x_k}{D}$$

is the zeroth-order component, and $$\varepsilon_i = \sum_{k=1}^{r} \frac{jn_k^2}{i2\pi}\left[\left(\cos\left(\frac{2\pi i}{D}x_{k-1}\right) - \cos\left(\frac{2\pi i}{D}x_k\right)\right) - j\left(\sin\left(\frac{2\pi i}{D}x_{k-1}\right) - \sin\left(\frac{2\pi i}{D}x_k\right)\right)\right]$$

is the $i^{th}$-order harmonic component, l indicates the lth one of the plurality of hypothetical layers, D is the pitch of said hypothetical deviated periodic structure, $n_k$ is the index of refraction of a material between material boundaries at $x_k$ and $x_{k-1}$, j is the imaginary number defined as the square root of $-1$, and there are r of said material boundaries within each period of said hypothetical deviated periodic structure.

22. A method of generating an expression of the permittivity of a target periodic grating having more than two materials in a periodic direction for use in an optical profilometry formalism for determining a diffracted reflectivity of the target periodic grating comprising:

dividing the target periodic grating into a plurality of hypothetical layers, at least one of the hypothetical layers formed across each of at least a first, second and third material occurring along a line parallel to a direction of periodicity of the target periodic grating;

subdividing at least one of the plurality of hypothetical layers into a plurality of hypothetical slabs to generate a plurality of hypothetical boundaries, each of the plurality of hypothetical boundaries corresponding to an intersection of at least one of the plurality of hypothetical layers with one of at least the first, second and third materials;

determining a permittivity function for each of the plurality of hypothetical layers;

completing a one-dimensional Fourier expansion of the permittivity function of each hypothetical layer along the direction of periodicity of the target periodic grating by summing the Fourier components over the plurality of hypothetical boundaries to provide harmonic components of the at least one permittivity function; and defining a permittivity harmonics matrix including the harmonic components of the Fourier expansion of the permittivity function.

23. The method of claim 22 wherein the step of completing a one dimensional Fourier transform of a permittivity function includes completing the one dimensional Fourier transform of the permittivity function $\epsilon_l(x)$ according to:

$$\varepsilon_l(x) = \sum_{i=-\infty}^{\infty} \varepsilon_{l,i} \exp\left(j\frac{2\pi i}{D}x\right)$$

where $$\varepsilon_0 = \sum_{k=1}^{r} n_k^2 \frac{x_{k-1} - x_k}{D}$$

is the zeroth order component, $$\varepsilon_{l,i} = \sum_{k=1}^{r} \frac{n_k^2}{-ji2\pi}\left[\left(\cos\left(\frac{2i\pi}{D}x_k\right) - \cos\left(\frac{2\pi i}{D}x_{k-1}\right)\right) - j\left(\sin\left(\frac{2i\pi}{D}x_k\right) - \sin\left(\frac{2i\pi}{D}x_{k-1}\right)\right)\right]$$

is the ith order component, l indicates the lth one of the plurality of hypothetical layers, D is the pitch of the target periodic grating, $n_k$ is the index of refraction of a material between each of the plurality of hypothetical boundaries at $x_k$ and $x_{k-1}$, j is the imaginary number defined as the square root of $-1$, and there are r hypothetical boundaries within each period of the target periodic grating.

24. The method of claim 23 wherein the permittivity harmonics matrix $E_l$ is a (2o+1) x(2o+1) Toeplitz-form matrix having the form:

$$E_l = \begin{bmatrix} \varepsilon_{l,0} & \varepsilon_{l,-1} & \varepsilon_{l,-2} & \cdots & \varepsilon_{l,-2o} \\ \varepsilon_{l,1} & \varepsilon_{l,0} & \varepsilon_{l,-1} & \cdots & \varepsilon_{l,-(2o-1)} \\ \varepsilon_{l,2} & \varepsilon_{l,1} & \varepsilon_{l,0} & \cdots & \varepsilon_{l,-(2o-2)} \\ \cdots & \cdots & \cdots & \cdots & \cdots \\ \varepsilon_{l,2o} & \varepsilon_{l,(2o-1)} & \varepsilon_{l,(2o-2)} & \cdots & \varepsilon_{l,0} \end{bmatrix}$$

where o is the order of the harmonic component.

25. The method of claim 22 wherein the step of completing a one dimensional Fourier transform of a permittivity function includes completing the one dimensional Fourier transform of the permittivity function $\pi_l(x)$ according to:

$$\pi_l(x) = \frac{1}{\varepsilon_l(x)} = \sum_{i=-\infty}^{\infty} \pi_{l,i} \exp\left(j\frac{2\pi i}{D}x\right)$$

where $$\pi_{l,0} = \sum_{k=1}^{r} \frac{1}{n_k^2} \frac{x_k - x_{k-1}}{D}$$

is the zeroth order component, $$\pi_{l,i} = \sum_{k=1}^{r} \frac{1}{-ji2\pi} \frac{1}{n_k^2} \left( \left( \cos\left(\frac{2\pi i}{D}x_k\right) - \cos\left(\frac{2\pi i}{D}x_{k-1}\right) \right) - j\left( \sin\left(\frac{2\pi i}{D}x_k\right) - \sin\left(\frac{2\pi i}{D}x_{k-1}\right) \right) \right)$$

is the ith order component, where l indicates the lth one of the plurality of hypothetical layers, D is the pitch of the target periodic grating, $n_k$ is the index of refraction of a material between each of the plurality of hypothetical boundaries at $x_k$ and $x_{k-1}$, j is the imaginary number defined as the square root of −1, and there are r hypothetical boundaries within each period of the target periodic grating.

26. The method of claim 25 wherein the permittivity harmonics matrix $P_l$ is a (2o+1)×(2o+1) Toeplitz-form matrix having the form:

$$P_l = \begin{bmatrix} \pi_{l,0} & \pi_{l,-1} & \pi_{l,-2} & \cdots & \pi_{l,2o} \\ \pi_{l,1} & \pi_{l,0} & \pi_{l,1} & \cdots & \pi_{l,-(2o-1)} \\ \pi_{l,2} & \pi_{l,1} & \pi_{l,0} & \cdots & \pi_{l,-(2o-2)} \\ \cdots & \cdots & \cdots & \cdots & \cdots \\ \pi_{l,2o} & \pi_{l,(2o-1)} & \pi_{l,(2o-2)} & \cdots & \pi_{l,0} \end{bmatrix}$$

where o is the order of the harmonic component.

27. A computer readable storage medium containing computer executable code for generating the theoretical diffracted reflectivity associated with diffraction of electromagnetic radiation off a target periodic grating to determine structural properties of the target periodic grating by instructing a computer to operate as follows:

divide the target periodic grating into a plurality of hypothetical layers, at least one of the hypothetical layers formed across each of at least a first, second and third material, each of the at least first, second and third materials occurring along a direction of periodicity of the target periodic grating, each separate hypothetical layer having one of a plurality of possible combinations of hypothetical values of properties for that hypothetical layer;

generate sets of hypothetical layer data, each set of hypothetical layer data corresponding to a separate one of the plurality of hypothetical layers; and process the generated sets of hypothetical layer data to generate the diffracted reflectivity that would occur by reflecting electromagnetic radiation off the periodic grating.

28. The computer readable storage medium of claim 27 wherein the computer is further instructed to subdivide the hypothetical layers into a plurality of slabs, each slab corresponding to the intersection of one of the plurality of layers with one of at least the first, second and third materials.

29. The computer readable storage medium of claim 28 wherein in dividing the target periodic grating into a plurality of hypothetical layers the computer is instructed to divide the target periodic grating into a plurality of hypothetical layers which are parallel to the direction of periodicity of the target periodic grating.

30. The computer readable medium of claim 27 wherein in generating sets of hypothetical layer data the computer is instructed to expand at least one of either a function of a real space permittivity and a function of a real space inverse permittivity of the hypothetical layers in a one-dimensional Fourier transformation along the direction of periodicity of the target periodic grating to provide harmonic components of the at least one of either a function of a real space permittivity and a function of a real space inverse permittivity of the hypothetical layers.

31. The computer readable storage medium of claim 27 wherein in generating sets of hypothetical layer data the computer is instructed to compute at least one of:

permittivity properties including a function of a permittivity $\epsilon_l(x)$ of each of the hypothetical layers of the target periodic grating, the harmonic components $\epsilon_{l,i}$ of the function of the permittivity $\epsilon_l(x)$, and a permittivity harmonics matrix $[E_l]$; and inverse-permittivity properties including a function of an inverse-permittivity $\pi_l(x)$ of each of the hypothetical layers of the target periodic grating, the harmonic components $\pi_{l,i}$ of the function of the inverse-permittivity $\pi_l(x)$, and an inverse-permittivity harmonics matrix $[P_l]$.

32. The computer readable medium of claim 31 wherein in processing the generated sets of hypothetical layer data the computer is instructed to:

compute a wave-vector matrix $[A_l]$ by combining a series expansion of the electric field of each of the hypothetical layers of the target periodic grating with at least one of at least the permittivity harmonics matrix $[E_l]$ and inverse-permittivity harmonics matrix $[P_l]$; and compute the ith entry $w_{l,i,m}$ of the mth eigenvector of the wave-vector matrix $[A_l]$ and the mth eigenvalue $\tau_{l,m}$ of the wave-vector matrix $[A_l]$ to form an eigenvector matrix $[W_l]$ and a root-eigenvalue matrix $[Q_l]$.

33. The computer readable medium of claim 27 wherein in generating sets of hypothetical layer data the computer is instructed to expand one of at least a permittivity $\epsilon_l(x)$ and an inverse-permittivity $\pi_l(x)=1/\epsilon_l(x)$ of the at least one of the hypothetical layers formed across each of at least the first, second and third materials of the target periodic grating in a one-dimensional Fourier transformation, the expansion performed along the direction of periodicity of the target periodic grating according to at least one of:

$$\varepsilon_l(x) = \sum_{i=-\infty}^{\infty} \varepsilon_{l,i} \exp\left(j\frac{2\pi i}{D}x\right)$$

where $$\varepsilon_{l,i} = \sum_{k=1}^{r} \frac{n_k^2}{-ji2\pi}\left[\left(\cos\left(\frac{2i\pi}{D}x_k\right) - \cos\left(\frac{2\pi i}{D}x_{k-1}\right)\right) - j\left(\sin\left(\frac{2i\pi}{D}x_k\right) - \sin\left(\frac{2i\pi}{D}x_{k-1}\right)\right)\right]$$

and $$\pi_l(x) = \frac{1}{\varepsilon_l(x)} = \sum_{i=-\infty}^{\infty} \pi_{l,i} \exp\left(j\frac{2\pi i}{D}x\right)$$

where $$\pi_{l,i} = \sum_{k=1}^{r} \frac{1}{-ji2\pi}\frac{1}{n_k^2}\left(\left(\cos\left(\frac{2\pi i}{D}x_k\right) - \cos\left(\frac{2\pi i}{D}x_{k-1}\right)\right) - j\left(\sin\left(\frac{2\pi i}{D}x_k\right) - \sin\left(\frac{2\pi i}{D}x_{k-1}\right)\right)\right)$$

where l indicates the lth one of the plurality of hypothetical layers, D is the pitch of said hypothetical deviated periodic structure, $n_k$ is the index of refraction of a material between material boundaries at $x_k$ and $x_{k-1}$, j is the imaginary number defined as the square root of −1 and there are r of said material boundaries within each period of said hypothetical deviated periodic structure.

34. The computer readable medium of claim 27, wherein in processing the generated sets of hypothetical layer data the computer is configured to:
construct a matrix equation from the intermediate data corresponding to the hypothetical layers of the target periodic grating; and
solve the constructed matrix equation to determine the diffracted reflectivity value $R_i$ for each harmonic order i.

35. A computer readable storage medium containing computer executable code for generating the diffracted reflectivity associated with diffraction of electromagnetic radiation off a target periodic grating to determine structural properties of the target periodic grating by instructing a computer to operate as follows:
divide the target periodic grating into a plurality of hypothetical layers, at least one of the hypothetical layers formed across each of at least a first, second and third material occurring along a line parallel to a direction of periodicity of the target periodic grating;
perform an harmonic expansion of a function of the permittivity $\epsilon_l(x)$ along the direction of periodicity of the target period grating for each of the hypothetical layers including the at least one of the plurality of layers formed across each of at least a first, second and third material;
set up Fourier space electromagnetic equations in each of the hypothetical layers using the harmonic expansion of the function of the permittivity $\epsilon_l(x)$ for said each of the hypothetical layers and Fourier components of electric and magnetic fields;
couple the Fourier space electromagnetic equations based on boundary conditions between the layers; and
solve the coupling of the Fourier space electromagnetic equations to provide a diffracted reflectivity.

36. The computer readable storage medium of claim 35 wherein the computer is further instructed to subdivide at least one of the plurality of hypothetical layers into a plurality of hypothetical slabs, each hypothetical slab corresponding to an intersection of the at least one of the plurality of hypothetical layers with one of at least the first, second and third materials.

37. The computer readable storage medium of claim 36 wherein in subdividing the at least one of the hypothetical layers into a plurality of hypothetical slabs the computer executable code instructs the computer to subdivide the at least one hypothetical layer into a plurality of hypothetical slabs such that only a single material lies along any line perpendicular to the direction of periodicity of the target periodic grating and normal to the target periodic grating.

38. The computer readable storage medium of claim 37 wherein in performing an harmonic expansion of a function of the permittivity $\epsilon_l(x)$ the computer code instructs the computer to perform the harmonic expansion such that:

$$\varepsilon_l(x) = \sum_{i=-\infty}^{\infty} \varepsilon_{l,i} \exp\left(j\frac{2\pi i}{D}x\right)$$

where:

$$\varepsilon_0 = \sum_{k=1}^{r} n_k^2 \frac{x_{k-1} - x_k}{D}$$

for the zeroth-order component, and $$\varepsilon_i = \sum_{k=1}^{r} \frac{jn_k^2}{i2\pi}\left[\left(\cos\left(\frac{2\pi i}{D}x_{k-1}\right) - \cos\left(\frac{2\pi i}{D}x_k\right)\right) - j\left(\sin\left(\frac{2\pi i}{D}x_{k-1}\right) - \sin\left(\frac{2\pi i}{D}x_k\right)\right)\right]$$

for the $i^{th}$-order harmonic component, where l indicates the lth one of the plurality of hypothetical layers, D is the pitch of said hypothetical deviated periodic structure, $n_k$ is the index of refraction of a material between material boundaries at $x_k$ and $x_{k-1}$, j is the imaginary number defined as the square root of −1, and there are r of said material boundaries within each period of said hypothetical deviated periodic structure.

39. A computer readable storage medium containing computer executable code for generating an expression of the permittivity of a target periodic grating having more than two materials in a periodic direction for use in an optical profilometry formalism for determining a diffracted reflectivity of the target periodic grating by instructing a computer to operate as follows:
divide the target periodic grating into a plurality of hypothetical layers, at least one of the hypothetical layers formed across each of at least a first, second and third material occurring along a line parallel to a direction of periodicity of the target periodic grating;

subdivide at least one of the plurality of hypothetical layers into a plurality of hypothetical slabs to generate a plurality of hypothetical boundaries, each of the plurality of hypothetical boundaries corresponding to an intersection of at least one of the plurality of hypothetical layers with one of at least the first, second and third materials;

determine a permittivity function for each of the plurality of hypothetical layers;

complete a one-dimensional Fourier expansion of the permittivity function of each hypothetical layer along the direction of periodicity of the target periodic grating by summing the Fourier components over the plurality of hypothetical boundaries to provide harmonic components of the at least one permittivity function; and define a permittivity harmonics matrix including the harmonic components of the Fourier expansion of the permittivity function.

40. The computer readable storage medium of claim 39 wherein in completing a one dimensional Fourier transform of a permittivity function the computer executable code instructs the computer to complete the one dimensional Fourier transform of the permittivity function $\varepsilon_l(x)$ according to:

$$\varepsilon_l(x) = \sum_{i=-\infty}^{\infty} \varepsilon_{l,i} \exp\left(j\frac{2\pi i}{D}x\right)$$

where $$\varepsilon_0 = \sum_{k=1}^{r} n_k^2 \frac{x_{k-1} - x_k}{D}$$

is the zeroth order component, $$\varepsilon_{l,i} = \sum_{k=1}^{r} \frac{n_k^2}{-ji2\pi}\left[\left(\cos\left(\frac{2\pi i}{D}x_k\right) - \cos\left(\frac{2\pi i}{D}x_{k-1}\right)\right) - j\left(\sin\left(\frac{2\pi i}{D}x_k\right) - \sin\left(\frac{2\pi i}{D}x_{k-1}\right)\right)\right]$$

is the ith order component, l indicates the lth one of the plurality of hypothetical layers, D is the pitch of the target periodic grating, $n_k$ is the index of refraction of a material between each of the plurality of hypothetical boundaries at $x_k$ and $x_{k-1}$, j is the imaginary number defined as the square root of −1, and there are r hypothetical boundaries within each period of the target periodic grating.

41. The computer readable storage medium of claim 40 wherein in defining a permittivity harmonics matrix $E_l$ the computer executable code instructs the computer to generate a (2o+1)×(2o+1) Toeplitz-form matrix having the form:

$$E_l = \begin{bmatrix} \varepsilon_{l,0} & \varepsilon_{l,-1} & \varepsilon_{l,-2} & \ldots & \varepsilon_{l,-2o} \\ \varepsilon_{l,1} & \varepsilon_{l,0} & \varepsilon_{l,-1} & \ldots & \varepsilon_{l,-(2o-1)} \\ \varepsilon_{l,2} & \varepsilon_{l,1} & \varepsilon_{l,0} & \ldots & \varepsilon_{l,-(2o-2)} \\ \ldots & \ldots & \ldots & \ldots & \ldots \\ \varepsilon_{l,2o} & \varepsilon_{l,(2o-1)} & \varepsilon_{l,(2o-2)} & \ldots & \varepsilon_{l,0} \end{bmatrix}$$

where o is the order of the harmonic component.

42. The computer readable storage medium of claim 39 wherein in completing a one dimensional Fourier transform of a permittivity function the computer executable code instructs the computer to complete the one dimensional Fourier transform of the permittivity function $\pi_l(x)$ according to:

$$\pi_l(x) = \frac{1}{\varepsilon_l(x)} = \sum_{i=-\infty}^{\infty} \pi_{l,i} \exp\left(j\frac{2\pi i}{D}x\right)$$

where $$\pi_{l,0} = \sum_{k=1}^{r} \frac{1}{n_k^2} \frac{x_k - x_{k-1}}{D}$$

is the zeroth order component, $$\pi_{l,i} = \sum_{k=1}^{r} \frac{1}{-ji2\pi} \frac{1}{n_k^2} \left[\left(\cos\left(\frac{2\pi i}{D}x_k\right) - \cos\left(\frac{2\pi i}{D}x_{k-1}\right)\right) - j\left(\sin\left(\frac{2\pi i}{D}x_k\right) - \sin\left(\frac{2\pi i}{D}x_{k-1}\right)\right)\right]$$

is the ith order component, l indicates the lth one of the plurality of hypothetical layers, D is the pitch of the target periodic grating, $n_k$ is the index of refraction of a material between each of the plurality of hypothetical boundaries at $x_k$ and $x_{k-1}$, j is the imaginary number defined as the square root of −1, and there are r hypothetical boundaries within each period of the target periodic grating.

43. The computer readable storage medium of claim 42 wherein in defining a permittivity harmonics matrix $P_l$ the computer executable code instructs the computer to generate a (2o+1)×(2o+1) Toeplitz-form matrix having the form:

$$P_l = \begin{bmatrix} \pi_{l,0} & \pi_{l,-1} & \pi_{l,-2} & \ldots & \pi_{l,-2o} \\ \pi_{l,1} & \pi_{l,0} & \pi_{l,-1} & \ldots & \pi_{l,-(2o-1)} \\ \pi_{l,2} & \pi_{l,1} & \pi_{l,0} & \ldots & \pi_{l,-(2o-2)} \\ \ldots & \ldots & \ldots & \ldots & \ldots \\ \pi_{l,2o} & \pi_{l,(2o-1)} & \pi_{l,(2o-2)} & \ldots & \pi_{l,0} \end{bmatrix}$$

where o is the order of the harmonic component.

44. A system for generating a theoretical diffracted reflectivity associated with diffraction of electromagnetic radiation off a target periodic grating to determine structural properties of the target periodic grating, including a computer processor configured to:

divide the target periodic grating into a plurality of hypothetical layers, at least one of the hypothetical layers formed across each of at least a first, second and third material, each of the at least first, second and third materials occurring along a direction of periodicity of the target periodic grating, each separate hypothetical layer having one of a plurality of possible combinations of hypothetical values of properties for that hypothetical layer;

generate sets of hypothetical layer data, each set of hypothetical layer data corresponding to a separate one of the plurality of hypothetical layers; and process the generated sets of hypothetical layer data to generate the diffracted reflectivity that would occur by reflecting electromagnetic radiation off the periodic grating.

45. The system of claim 44 wherein the computer processor is further configured to subdivide the hypothetical layers into a plurality of slabs, each slab corresponding to the intersection of one of the plurality of layers with one of at least the first, second and third materials.

46. The system of claim 45 wherein in dividing the target periodic grating into a plurality of hypothetical layers the computer processor is further configured to divide the target periodic grating into a plurality of hypothetical layers which are parallel to the direction of periodicity of the target periodic grating.

47. The system of claim 44 wherein in generating sets of hypothetical layer data the computer processor is configured to expand at least one of either a function of a real space permittivity and a function of a real space inverse permittivity of the hypothetical layers in a one-dimensional Fourier transformation along the direction of periodicity of the target periodic grating to provide harmonic components of the at least one of either a function of a real space permittivity and a function of a real space inverse permittivity of the hypothetical layers.

48. The system of claim 44 wherein in generating sets of hypothetical layer data the computer processor is configured to compute at least one of:

permittivity properties including a function of a permittivity $\epsilon_l(x)$ of each of the hypothetical layers of the target periodic grating, the harmonic components $\epsilon_{l,i}$ of the function of the permittivity $\epsilon_l(x)$, and a permittivity harmonics matrix $[E_l]$; and inverse-permittivity properties including a function of an inverse-permittivity $\pi_l(x)$ of each of the hypothetical layers of the target periodic grating, the harmonic components $\pi_{l,i}$ of the function of the inverse-permittivity $\pi_l(x)$, and an inverse-permittivity harmonics matrix $[P_l]$.

49. The system of claim 48 wherein in processing the generated sets of hypothetical layer data the computer processor is configured to:

compute a wave-vector matrix $[A_l]$ by combining a series expansion of the electric field of each of the hypothetical layers of the target periodic grating with at least one of at least the permittivity harmonics matrix $[E_l]$ and inverse-permittivity harmonics matrix $[P_l]$.

compute the ith entry $w_{l,i,m}$ of the mth eigenvector of the wave-vector matrix $[A_l]$ and the mth eigenvalue $\tau_{l,m}$ of the wave-vector matrix $[A_l]$ to form an eigenvector matrix $[W_l]$ and a root-eigenvalue matrix $[Q_l]$.

50. The system of claim 44 wherein in generating sets of hypothetical layer data the computer processor is configured to expand one of at least a function of a permittivity $\epsilon_l(x)$ and a function of an inverse permittivity $\pi_l(x)=1/\epsilon_l(x)$ of the at least one of the hypothetical layers formed across each of at least the first, second and third materials of the target periodic grating in a one-dimensional Fourier transformation, the expansion performed along the direction of periodicity of the target periodic grating according to at least one of:

$$\epsilon_l(x) = \sum_{i=-\infty}^{\infty} \epsilon_{l,i} \exp\left(j\frac{2\pi i}{D}x\right)$$

where $$\epsilon_{l,i} = \sum_{k=1}^{r} \frac{n_k^2}{-ji2\pi}\left[\left(\cos\left(\frac{2i\pi}{D}x_k\right)-\cos\left(\frac{2\pi i}{D}x_{k-1}\right)\right)-\right.$$

$$\left. j\left(\sin\left(\frac{2i\pi}{D}x_k\right)-\sin\left(\frac{2\pi i}{D}x_{k-1}\right)\right)\right]$$

and $$\pi_l(x) = \frac{1}{\epsilon_l(x)} = \sum_{i=-\infty}^{\infty} \pi_{l,i}\exp\left(j\frac{2\pi i}{D}x\right)$$

where $$\pi_{l,i} = \sum_{k=1}^{r} \frac{1}{-ji2\pi}\frac{1}{n_k^2}$$

$$\left(\left(\cos\left(\frac{2\pi i}{D}x_k\right)-\cos\left(\frac{2\pi i}{D}x_{k-1}\right)\right)-j\left(\sin\left(\frac{2\pi i}{D}x_k\right)-\sin\left(\frac{2\pi i}{D}x_{k-1}\right)\right)\right)$$

where l indicates the lth one of the plurality of hypothetical layers, D is the pitch of said hypothetical deviated periodic structure, $n_k$ is the index of refraction of a material between material boundaries at $x_k$ and $x_{k-1}$, j is the imaginary number defined as the square root of −1, and there are r of said material boundaries within each period of said hypothetical deviated periodic structure.

51. The system of claim 44, wherein in processing the generated sets of hypothetical layer data the computer processor is configured to:

construct a matrix equation from the intermediate data corresponding to the hypothetical layers of the target periodic grating; and solve the constructed matrix equation to determine the diffracted reflectivity value $R_i$ for each harmonic order i.

52. A system of generating the diffracted reflectivity associated with diffraction of electromagnetic radiation off a target periodic grating to determine structural properties of the target periodic grating, including a computer microprocessor configured to:

divide the target periodic grating into a plurality of hypothetical layers, at least one of the hypothetical layers formed across each of at least a first, second and third material occurring along a line parallel to a direction of periodicity of the target periodic grating;

perform an harmonic expansion of a function of the permittivity $\epsilon$ along the direction of periodicity of the target period grating for each of the hypothetical layers including the at least one of the plurality of layers formed across each of at least a first, second and third material;

set up Fourier space electromagnetic equations in each of the hypothetical layers using the harmonic expansion of the function of the permittivity $\epsilon$ for said each of the hypothetical layers and Fourier components of electric and magnetic fields;

couple the Fourier space electromagnetic equations based on boundary conditions between the layers; and solve the coupling of the Fourier space electromagnetic equations to provide a diffracted reflectivity.

53. The system of claim 52 wherein the computer processor is further configured to subdivide at least one of the plurality of hypothetical layers into a plurality of hypothetical slabs, each hypothetical slab corresponding to an intersection of the at least one of the plurality of hypothetical layers with one of at least the first, second and third materials.

54. The system of claim 53 wherein in subdividing at least one of the hypothetical layers into a plurality of hypothetical slabs, the computer processor is configured to subdivide the at least one hypothetical layer into a plurality of hypothetical slabs such that only a single material lies along any line perpendicular to the direction of periodicity of the target periodic grating and normal to the target periodic grating.

55. The system of claim 52 wherein in performing an harmonic expansion of a function of the permittivity the computer processor is configured to generate the harmonic expansion of the function of the permittivity along the direction of periodicity of the target periodic grating for the at least one of the hypothetical layers formed across each of at least the first, second and third material such that:

$$\varepsilon_l(x) = \sum_{i=-\infty}^{\infty} \varepsilon_{l,i} \exp\left(j\frac{2\pi i}{D}x\right)$$

where, $$\varepsilon_0 = \sum_{k=1}^{r} n_k^2 \frac{x_{k-1} - x_k}{D}$$

for the zeroth-order component, and $$\varepsilon_i = \sum_{k=1}^{r} \frac{jn_k^2}{i2\pi}\left[\left(\cos\left(\frac{2\pi i}{D}x_{k-1}\right) - \cos\left(\frac{2\pi i}{D}x_k\right)\right) - j\left(\sin\left(\frac{2\pi i}{D}x_{k-1}\right) - \sin\left(\frac{2\pi i}{D}x_k\right)\right)\right]$$

for the $i^{th}$-order harmonic component, and where l indicates the lth one of the plurality of hypothetical layers, D is the pitch of said hypothetical deviated periodic structure, $n_k$ is the index of refraction of a material between material boundaries at $x_k$ and $x_{k-1}$, j is the imaginary number defined as the square root of −1, and there are r of said material boundaries within each period of said hypothetical deviated periodic structure.

56. A system of generating an expression of the permittivity of a target periodic grating having more than two materials in a periodic direction for use in an optical profilometry formalism for determining a diffracted reflectivity of the target periodic grating including a computer processor configured to:
    divide the target periodic grating into a plurality of hypothetical layers, at least one of the hypothetical layers formed across each of at least a first, second and third material occurring along a line parallel to a direction of periodicity of the target periodic grating;
    subdivide at least one of the plurality of hypothetical layers into a plurality of hypothetical slabs to generate a plurality of hypothetical boundaries, each of the plurality of hypothetical boundaries corresponding to an intersection of at least one of the plurality of hypothetical layers with one of at least the first, second and third materials;
    determine a permittivity function for each of the plurality of hypothetical layers;
    complete a one-dimensional Fourier expansion of the permittivity function of each hypothetical layer along the direction of periodicity of the target periodic grating by summing the Fourier components over the plurality of hypothetical boundaries to provide harmonic components of the at least one permittivity function; and
    define a permittivity harmonics matrix including the harmonic components of the Fourier expansion of the permittivity function.

57. The system of claim 56 wherein in completing a one dimensional Fourier transform of a permittivity function the computer processor is configured to complete a one dimensional Fourier transform of the permittivity function $\varepsilon_l(x)$ according to:

$$\varepsilon_l(x) = \sum_{i=-\infty}^{\infty} \varepsilon_{l,i} \exp\left(j\frac{2\pi i}{D}x\right)$$

where $$\varepsilon_0 = \sum_{k=1}^{r} n_k^2 \frac{x_{k-1} - x_k}{D}$$

is the zeroth order component, $$\varepsilon_{l,i} = \sum_{k=1}^{r} \frac{n_k^2}{ji2\pi}\left[\left(\cos\left(\frac{2i\pi}{D}x_k\right) - \cos\left(\frac{2\pi i}{D}x_{k-1}\right)\right) - j\left(\sin\left(\frac{2i\pi}{D}x_k\right) - \sin\left(\frac{2i\pi}{D}x_{k-1}\right)\right)\right]$$

is the ith order component, l indicates the lth one of the plurality of hypothetical layers, D is the pitch of the target periodic grating, $n_k$ is the index of refraction of a material between each of the plurality of hypothetical boundaries at $x_k$ and $x_{k-1}$, j is the imaginary number defined as the square root of −1, and there are r hypothetical boundaries within each period of the target periodic grating.

58. The system of claim 57 wherein in defining the permittivity harmonics matrix $E_l$ the computer processor constructs a (2o+1)×(2o+1) Toeplitz-form matrix having the form:

$$E_l = \begin{bmatrix} \varepsilon_{l,0} & \varepsilon_{l,-1} & \varepsilon_{l,-2} & \cdots & \varepsilon_{l,-2o} \\ \varepsilon_{l,1} & \varepsilon_{l,0} & \varepsilon_{l,-1} & \cdots & \varepsilon_{l,-(2o-1)} \\ \varepsilon_{l,2} & \varepsilon_{l,1} & \varepsilon_{l,0} & \cdots & \varepsilon_{l,-(2o-2)} \\ \cdots & \cdots & \cdots & \cdots & \cdots \\ \varepsilon_{l,2o} & \varepsilon_{l,(2o-1)} & \varepsilon_{l,(2o-2)} & \cdots & \varepsilon_{l,0} \end{bmatrix}$$

where o is the order of the harmonic component.

59. The system of claim 56 wherein in completing a one dimensional Fourier transform of a permittivity function the computer processor completes a one dimensional Fourier transform of the permittivity function $\pi_l(x)$ according to:

$$\pi_l(x) = \frac{1}{\varepsilon_l(x)} = \sum_{i=-\infty}^{\infty} \pi_{l,i} \exp\left(j\frac{2\pi i}{D}x\right)$$

where $$\pi_{l,0} = \sum_{k=1}^{r} \frac{1}{n_k^2} \frac{x_k - x_{k-1}}{D}$$

is the zeroth order component, $$\pi_{l,i} = \sum_{k=1}^{r} \frac{1}{-ji2\pi} \frac{1}{n_k^2}$$
$$\left( \left( \cos\left(\frac{2\pi i}{D} x_k\right) - \cos\left(\frac{2\pi i}{D} x_{k-1}\right) \right) - j\left( \sin\left(\frac{2\pi i}{D} x_k\right) - \sin\left(\frac{2\pi i}{D} x_{k-1}\right) \right) \right)$$

is the ith order component, l indicates the lth one of the plurality of hypothetical layers, D is the pitch of the target periodic grating, $n_k$ is the index of refraction of a material between each of the plurality of hypothetical boundaries at $x_k$ and $x_{k-1}$, j is the imaginary number defined as the square root of $-1$, and there are r hypothetical boundaries within each period of the target periodic grating.

60. The system of claim 59 wherein in defining the permittivity harmonics matrix $P_l$ the computer processor constructs a $(2o+1) \times (2o+1)$ Toeplitz-form matrix having the form:

$$P_l = \begin{bmatrix} \pi_{l,0} & \pi_{l,-1} & \pi_{l,-2} & \cdots & \pi_{l,-2o} \\ \pi_{l,1} & \pi_{l,0} & \pi_{l,-1} & \cdots & \pi_{l,-(2o-1)} \\ \pi_{l,2} & \pi_{l,1} & \pi_{l,0} & \cdots & \pi_{l,-(2o-2)} \\ \cdots & \cdots & \cdots & \cdots & \cdots \\ \pi_{l,2o} & \pi_{l,(2o-1)} & \pi_{l,(2o-2)} & \cdots & \pi_{l,0} \end{bmatrix}$$

where o is the order of the harmonic component.

\* \* \* \* \*